US005461513A

United States Patent [19]

Maruyama

[11] Patent Number: 5,461,513
[45] Date of Patent: Oct. 24, 1995

[54] IMAGE STABILIZING APPARATUS

[75] Inventor: Koichi Maruyama, Tokyo, Japan

[73] Assignee: Asahi Kogaku Kogyo Kabushiki Kaisha, Tokyo, Japan

[21] Appl. No.: 26,752

[22] Filed: Mar. 5, 1993

Related U.S. Application Data

[62] Division of Ser. No. 578,202, Sep. 6, 1990, Pat. No. 5,280,387.

[30] Foreign Application Priority Data

| Sep. 6, 1989 | [JP] | Japan | 1-104713 |
| Sep. 6, 1989 | [JP] | Japan | 1-104714 |
| Sep. 6, 1989 | [JP] | Japan | 1-231056 |
| Sep. 6, 1989 | [JP] | Japan | 1-231057 |

[51] Int. Cl.$^6$ .............. G02B 5/04; G02B 27/64
[52] U.S. Cl. .............. 359/837; 359/554; 359/557; 359/831
[58] Field of Search .............. 359/554–557, 359/831–832, 837, 196, 209–211, 640, 668–671

[56] References Cited

U.S. PATENT DOCUMENTS

| 2,427,996 | 9/1947 | Seaman | 359/832 |
| 3,034,398 | 5/1962 | Barnes et al. | 359/831 |
| 3,226,721 | 12/1965 | Gould | 359/211 |
| 3,514,192 | 5/1970 | De La Cierva | 359/557 |
| 3,655,274 | 4/1972 | Craig | 359/832 |
| 3,900,263 | 8/1975 | Hall, Jr. | 359/837 |
| 3,941,451 | 3/1976 | Humphrey | 359/557 |
| 3,964,817 | 6/1976 | Humphrey | 359/555 |
| 4,013,339 | 3/1977 | Ando et al. | 359/556 |
| 4,118,109 | 10/1978 | Crawford et al. | 359/211 |
| 4,235,506 | 11/1980 | Saito et al. | 359/556 |

(List continued on next page.)

FOREIGN PATENT DOCUMENTS

| 2505512 | 11/1982 | France | 359/837 |
| 57-7416 | 2/1982 | Japan . |
| 62-153816 | 7/1987 | Japan . |
| 63-146015 | 6/1988 | Japan . |
| 63-169614 | 7/1988 | Japan . |
| 474572 | 4/1989 | U.S.S.R. . |
| 468227 | 7/1937 | United Kingdom . |
| 509269 | 7/1939 | United Kingdom . |
| 607033 | 8/1948 | United Kingdom . |
| 656908 | 9/1951 | United Kingdom . |
| 748491 | 5/1956 | United Kingdom . |
| 774437 | 5/1957 | United Kingdom . |
| 0774437 | 5/1957 | United Kingdom . |
| 1235707 | 6/1971 | United Kingdom . |
| 1464951 | 2/1977 | United Kingdom . |
| 1516799 | 7/1978 | United Kingdom . |
| 2061545 | 5/1981 | United Kingdom . |
| 1594060 | 7/1981 | United Kingdom . |

OTHER PUBLICATIONS

Smith, "Modern Optical Engineering," 1966, McGraw Hill, Inc., pp. 74–76.
R. Kingslake, "Applied Optics in Optical Engineering," vol. 5, 1969 (London), Academic Press, pp. 15–16.
Japanese Abstract and English translation of Japanese Patent Document No. SHO 57-7416.
English Abstract of Japanese Patent Document No. SHO 63-169614.
English Abstract of Japanese Patent Document No. SHO 62-153816.
English Abstract of Japanese Patent Document No. SHO 63-146015.

Primary Examiner—Thong Q. Nguyen
Attorney, Agent, or Firm—Sandler, Greenblum & Bernstein

[57] ABSTRACT

An image stabilizing apparatus is disclosed comprising an imaging optical system for forming an image of a subject onto an imaging surface. A deflector has first and second liquid prisms disposed with a movable transparent plate therebetween, and a controller changes vertex angles of the respective prisms by inclining the movable transparent plate in order to correct for a displacement of the image on the imaging surface.

16 Claims, 21 Drawing Sheets

U.S. PATENT DOCUMENTS

| | | | |
|---|---|---|---|
| 4,465,346 | 8/1984 | Fraser | 359/556 |
| 4,781,445 | 11/1988 | Baba et al. | 359/832 |
| 4,840,465 | 6/1989 | Loy et al. | 359/669 |
| 4,840,473 | 6/1989 | Kushibiki et al. | 359/196 |
| 4,850,686 | 7/1989 | Morimoto | 359/837 |
| 4,927,250 | 5/1990 | Suda | 359/557 |
| 4,943,155 | 7/1990 | Cross, Jr. | 359/640 |
| 5,002,364 | 3/1991 | Stenblik | 359/831 |
| 5,121,978 | 6/1992 | Maruyama | 359/557 |
| 5,122,217 | 6/1992 | Sugahara | 156/304.2 |

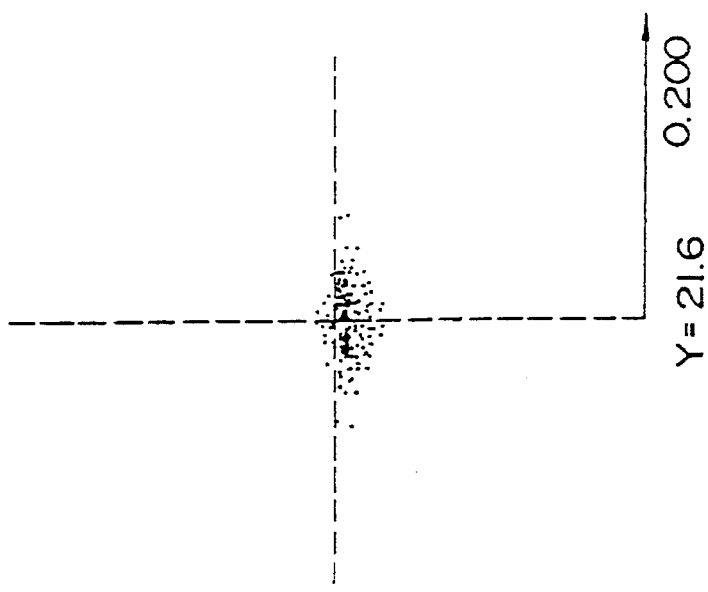
FIG. 5(a)  Y=-21.6
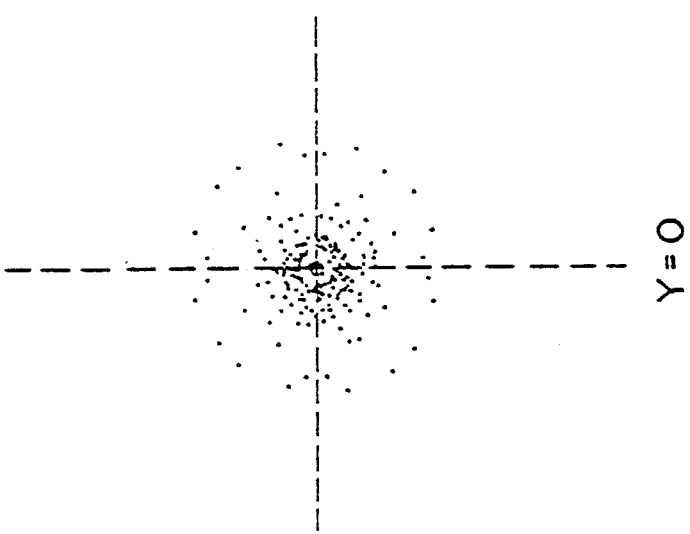
FIG. 5(b)  Y=0
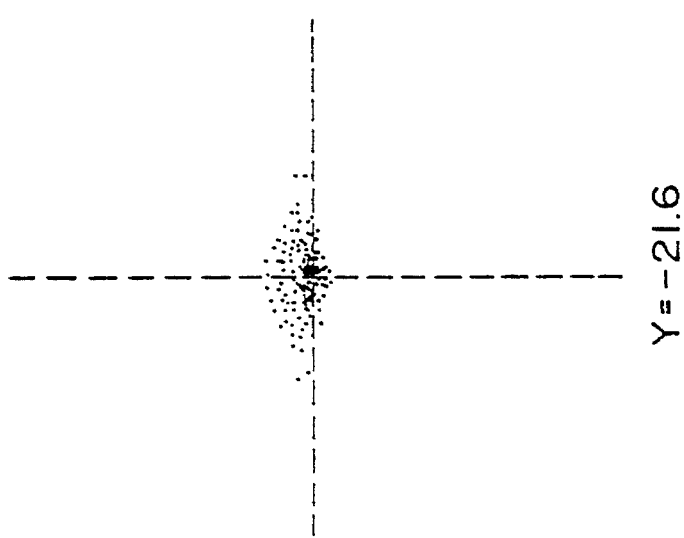
FIG. 5(c)  Y=21.6  0.200

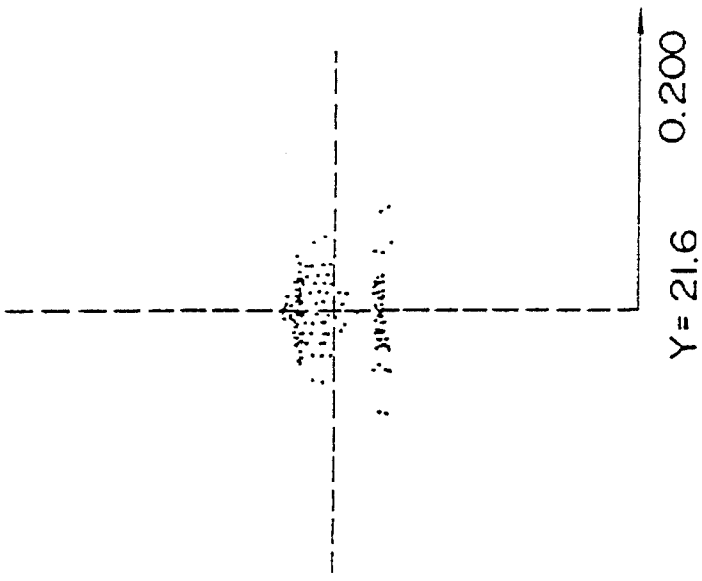
FIG.8(c)  Y=21.6
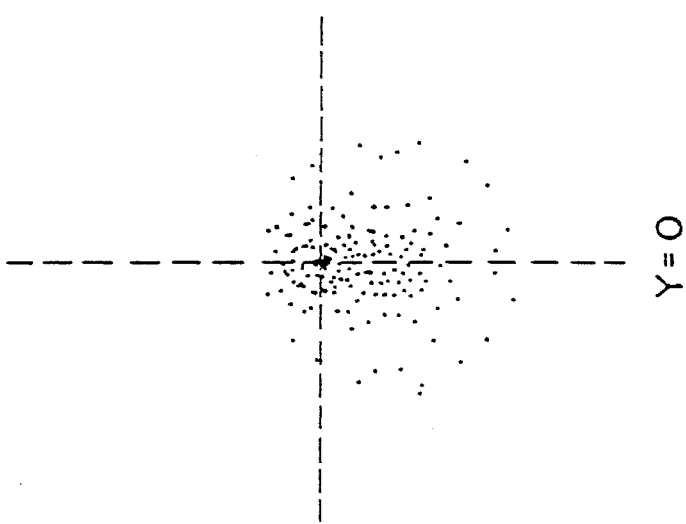
FIG.8(b)  Y=0
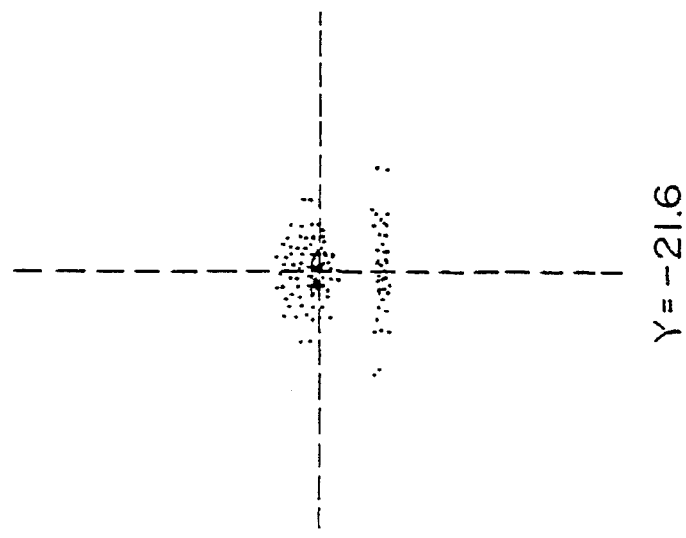
FIG.8(a)  Y=-21.6

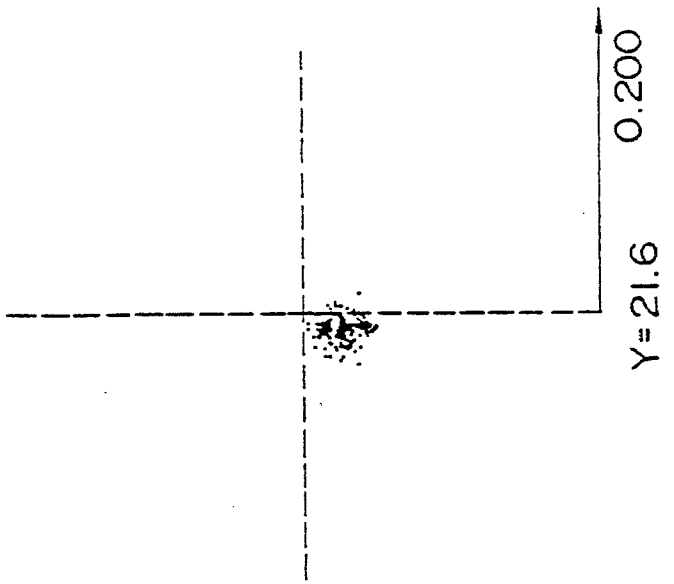
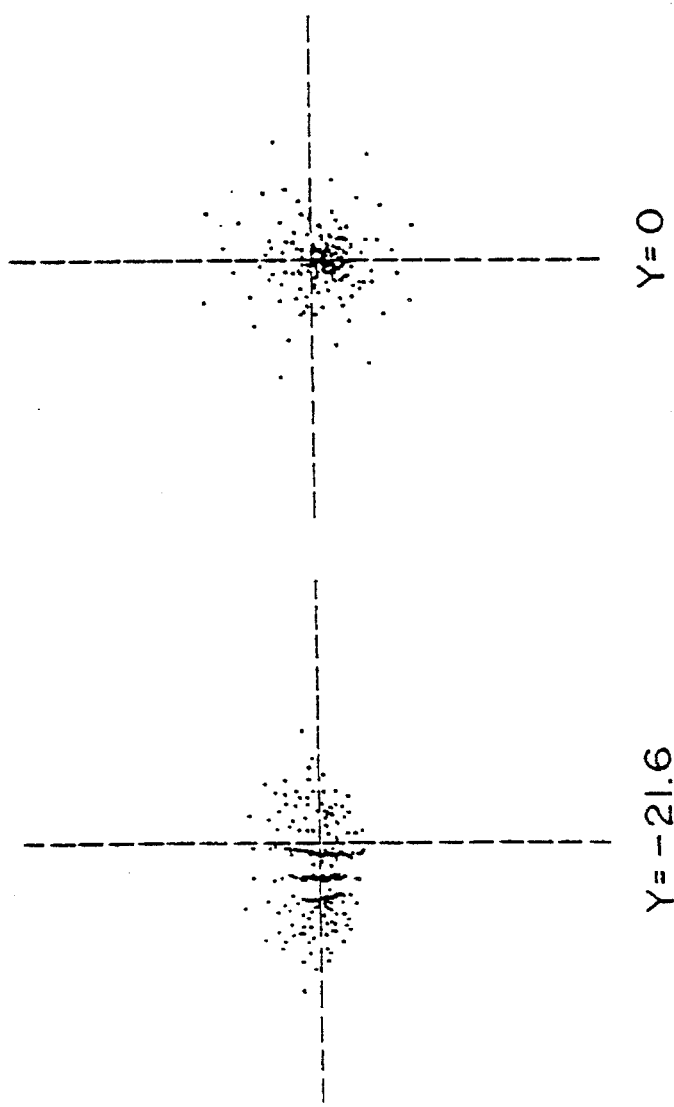

5,461,513

1

IMAGE STABILIZING APPARATUS

This application is a division of application Ser. No. 07/578,202, filed Sept. 6, 1990, now U.S. Pat. No. 5,280, 387.

BACKGROUND OF THE INVENTION

1. Field of the Invention

This invention relates to an image stabilizing apparatus capable of correcting a displacement of the image in order to prevent an image deterioration caused by an accidental inclination a so-called camera shake when a picture is being taken.

2. Description of the Prior Art

When taking a photograph from a moving car or airplane, a taking image tends to displace due to vibration of the moving car or airplane, and particularly where exposure time is long, a fine image is difficult to take. Also, the same problem tends to occur when a long focus lens is used because it is easily adversely affected by vibration.

Means for preventing the displacement of image caused by such vibration is disclosed in, for example, Japanese Patent Publication No. Sho 57-7416 and Japanese Patent Early Laid-open Publication No. Sho 63-169614.

A liquid prism disclosed in the Japanese Patent Publication No. Sho 57-7416, in which chromatic aberration is corrected, comprises two movable trasparent plates disposed with a space between them a fixed transparent plate disposed between the movable transparent plates for partitioning the space, and two kinds of liquid having different Abbe numbers filled in the respective partitioned spaces. The adjustment of a deflecting function is effected by inclining the movable transparent plates in accordance with the angle of inclination of a lens system.

However, in the liquid prism of the Japanese Patent Publication No. Sho 57-7416, the plural transparent plates must be moved and therefore, the structure becomes complicated. Furthermore, since the outward form of the prism is changed, it is required to have a surplus arrangement space.

Next, the Japanese Patent Early Laid-open Publication No. Sho 63-169614 discloses an apparatus for correcting the displacement of an image by changing the composite deflecting function by pivoting first and second prisms on an optical axis.

However, with the construction of the Japanese Patent Early Laid-open Publication No. Sho 63-169614, the light incident surface of the first prism and outgoing surface of the second prism are not in parallel relation. Accordingly, in case this is to be mounted on a vibration-proof optical system, it is necessary to maintain an arrangement space with reference to the most projected portion and therefore, it also requires a surplus arrangement space.

Also, in the Japanese Patent Early Laid-open Publication No. Sho 63-169614, the angle formed by axes indicating the deflecting function of two prisms is 180° in an initial state as shown in FIG. 24. FIG. 24 shows the deflecting function of the prisms projected onto a plane vertical to the optical axis of the optical system. Therefore, the deflecting function in order to correct the displacement of an image, which is corrected when two prisms are pivoted by a micro angle, is perpendicular to the axes indicating the initial deflecting function. The term "axis of the deflecting function" refers to a vector OP which, as shown in FIG. 25, is drawn from a

2 point of intersection between an optical axis Ax of the optical system and a plane H vertical to the optical axis Ax to a point of intersection between a ray deflected after being made incident to the prism after passing on the optical axis Ax and the plane H. The plane H is, in general, an image plane in an imaging optical system.

FIG. 24 shows a coordinate explaining the deflecting function of the prisms on the image plane, and the origin O is a point of intersection between the optical axis of the lens system and the image plane. The amount of deflecting functions of the two prisms are the same.

In the Figure, the deflecting function on the image plane by the first prism in the initial state is expressed by vector AO and the deflecting function by the second prism is likewise expressed by vector BO. In the initial state, the two vectors form an angle of 180°. Since the two vectors offset each other, the image is not displaced.

In case the first prism is pivoted clockwise or in case the second prism is pivoted counterclockwise, the vectors indicating the deflection function of the respective prisms are expressed by a linear line of which starting point is the origin O and terminal point is a point on a circular arc R. In the Figure, the respective circular arcs indicated with angles are used as a coordinate for explaining the vector composed of the deflecting functions of the two prisms. The radius of each reference arc is the same as the vectors AO and BO, and the centers thereof are points spaced apart by 10° along the circular arc R.

The reference arc indicated by a plus angle is an aggregation of dots which can be the terminal point of the vector indicating the deflecting function composed when the vector AO is pivoted by that angle. The reference arc expressed by the same minus angle, is an aggregation of dots which can be the terminal point of the vector composed when the vector BO is pivoted by that angle. Therefore, if the angles of pivot for the both prisms are apparent, the deflecting function be indicated as the vector drawn from the origin O to the point determined by pivot angles.

For example, the deflecting function is indicated by vector C when the first prism (vector AO) is pivoted by 30° from the initial state and the second prism (vector BO) is pivoted by −20°.

With the above-mentioned construction, when the direction of the deflecting function needed to correct the image displacement is not coincident with the initial deflecting function AO, BO, the first and second prisms must be instantaneously pivoted normally and reversely by 90°, and there arises a problem in responsibility.

Also, a signal for controlling the pivot of the prisms become a complicated function based on the initial positions of the prisms.

SUMMARY OF THE INVENTION

A first object of the present invention is to provide a liquid prism which is not changed in outward form when an optical path is deflected and which is capable of changing the apex angles of two prisms by moving a single transparent plate, and also to provide an image stabilizing apparatus using this liquid prism.

A second object of the present invention is to provide a prism in which a light incident surface and a light outgoing surface are in parallel relation, and to provide an image stabilizing apparatus using this liquid prism.

A third object of the present invention is to provide an image stabilizing apparatus which is capable of correcting the image displacement even when an image plane is inclined in any direction caused by inclination of an imaging optical system.

BRIEF DESCRIPTION OF THE DRAWINGS

FIGS. 5(a) to 5(c) are spot diagrams of the lens shown in FIG. 3;

FIGS. 8(a) to 8(c) are spot diagrams representing the state shown in FIG. 7;

FIGS. 17(a) to 17(c) are spot diagrams according to the construction of FIG. 16;

DETAILED DESCRIPTION OF THE EMBODIMENTS

The embodiment of the present invention will now be described hereinafter with reference to the drawings. The term "prism" when used herein includes single prisms and cemented prisms (i.e., pieced together or multiple prisms) for correcting chromatic aberration.

In order to correct chromatic aberration caused by dispersion of prisms, the present invention may be designed such that two prisms having different Abbe numbers are cemented (i.e., pieced together) and if the vertex angles of these prisms are represented by δ1, δ2, the following condition is satisfied.

$$\delta 1/\delta 2 = -\{(nd2-1)/(nd1-1)\}\cdot(v1/v2)$$

wherein the refractive index and the Abbe number of the first and second prisms are represented by nd1, nd2, v1 and v2 respectively.

FIRST EMBODIMENT

FIGS. 1 through 8 show a first embodiment.

Figure 1:
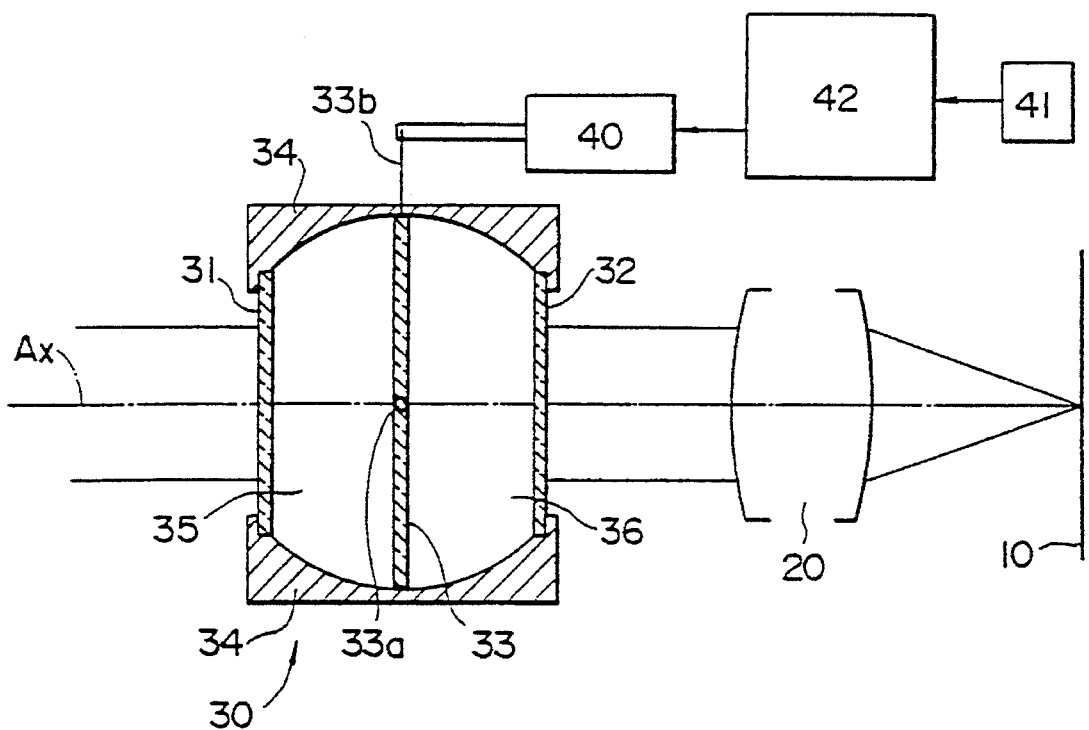
FIG. 1 is a schematic view showing a first embodiment of an image stabilizing apparatus according to the present invention.

An image stabilizing optical system of the first embodiment is utilized as a taking lens of a camera and includes, as shown in FIG. 1, an imaging lens system 20 for forming a image on a image receiving surface 10 such as a film surface, CCD, and an optical path deflecting portion 30 for correcting the displacement of the image relative to inclination caused by vibration of the whole optical system.

The optical path deflecting portion 30 has first and second transparent plates 31 and 32 fixed relative to an optical axis Ax of the imaging lens system 20. A third transparent plate 33 is disposed between the first and second transparent plates 31 and 32 and is able to incline relative to the optical axis Ax. A framework 34 surrounds the peripheral edges of these transparent plates and forms two chambers between these transparent plates.

The third transparent plate 33 has a pivot shaft 33a lying in a plane intersecting the optical axis Ax of the imaging lens system 20. Transparent plate 33 can be inclined relative to the optical axis Ax by actuating an actuator 40 connected to an operating piece 33b projecting outside the framework 34. The peripheral wall of the framework 34 is formed in a circular arc shape along the direction of the optical axis Ax so that the third transparent plate 33 can be pivoted.

The chamber between the first and third transparent plates 31 and 33 is filled with a first liquid so that a first liquid prism 35 is formed, and the chamber between the second and third transparent plates 32 and 33 is filled with a second liquid so that a second liquid prism 36 is formed. The portion between the third transparent plate 33 and the framework 34 is sealed in order to prevent a mixing of two kinds of liquid.

It is to be noted that the optical path deflecting portion 30 is not limited to the above-mentioned construction. For example, a two liquid prism unit may be disposed with an inclinable transparent plate therebetween. Each liquid prism unit is formed of two transparent plates covered with a flexible film and filled with liquid. The transparent plate at the inner side of each unit is fixed to the inclinable transparent plate, and the transparent plate at the outer side thereof is fixed to a lens-barrel.

According to thus construction as mentioned above, the liquid prism can be exchanged per unit with which liquid is filled, and the characteristics of the optical path deflecting portion 30 can be changed more easily than exchanging preliminary prepared liquid in the chamber.

The first and second liquids satisfy the following condition:

$$(nd1-1)/v1 \doteqdot (nd2-1)/v2,$$

wherein the refractive indexes at the center wavelength in a visible region are represented by nd1 and nd2, respectively, and the Abbe numbers are represented by v1 and v2, respectively.

In this way, in case the inclinable third transparent plate is disposed between two parallel transparent plates, the vertex angles of the first and second liquid prisms become equal to each other. If this vertex angle is represented by δ, the composed deflecting angle β of the first and second prisms with respect to the center wavelength of a visible region can be resembled in the region where the apex angle is small as follows:

$$\beta = (nd1-nd2)\cdot\delta$$

Therefore, if the inclination angle caused by vibration of the lens system is represented by θ, since the following condition is satisfied, there can be corrected a displacement of the image on the image plane:

$$(nd1-nd2)\cdot\delta = \theta$$

Also, the deflecting function for wavelengths other than the above, is changed depending on the dispersion value of the liquid. However, in case an absolute value of the composed dispersion value of the two prisms is set to a large value, generation of difference in deflection depending on wavelength, that is, generation of chromatic aberration, can be reduced. In this embodiment, a composed deflecting angle relative to a d-line is represented by βd, a composed deflecting angle relative to an F-line is represented by βF, and the composed dispersion value of the prisms relative to a C-line is represented by βC, and the composed dispersion value of the prisms is defined as follows:

$$\beta d/(\beta F - \beta C).$$

If the Abbe numbers of the first and second liquid prisms are represented by v1 and v2, respectively, the refractive indices of the first liquid prism at an F-line (wavelength 486 nm) and a C-line (wavelength 656 nm), which serve as generally both ends of the visible region, are represented by n1F and n1C, and the refractive indices of the second liquid prism are represented by n2F and n2C. The deflecting angles βF and βC for light of the respective wavelengths can be expressed by the following expression:

$$\beta F = (nF1-nF2)\cdot\delta$$

$$\beta C = (nC1-nC2)\cdot\delta$$

where δ represents the vertex angle of the first and second liquid prisms.

In order to make the both deflecting angles equal to each other, it is necessary to satisfy the following expressions:

$$(nF1-nF2)\cdot\delta = (nC1-nC2)\cdot\delta$$

$$nF1-nC1 = nF2-nC2 \qquad (1).$$

If this condition is satisfied, generation of chromatic aberration can be substantially reduced in the visible region.

The Abbe number of the two liquid prisms can be expressed by the following equations:

$$v1 = (nd1-1)/(nF1-nC1) \qquad (2)$$

$$v2 = (nd2-1)/(nF2-nC2) \qquad (3)$$

Therefore, there can be introduced the following condition based on the equations (1) through (3).

$$(nd1-1)/v1 \doteqdot (nd2-1)/v2$$

If this condition is satisfied, generation of the chromatic aberration can be reduced.

Concrete examples of a liquid combination are listed below. According to the following combinations, there can be obtained a comparatively large deflecting function with a comparatively small apex angle δ.

<EXAMPLE OF FIRST COMBINATION>
BENZYLAMINE

| | | |
|---|---|---|
| nd = 1.54406 | v = 31.05 | (nd − 1)/v = 0.01752 |
| nd − ng = 0.02347 | | |

ACETYLACETONE

| | | |
|---|---|---|
| nd = 1.45178 | v = 25.76 | (nd − 1)/v = 0.01754 |
| nd − ng = 0.02580 | Δ nd = 0.09228 | Δ (nd − 1)/v = −0.00002 |

<EXAMPLE OF SECOND COMBINATION>
PHENOL

| | | |
|---|---|---|
| nd = 1.54247 | v = 28.70 | (nd − 1)/v = 0.01890 |
| nd − ng = 0.02593 | | |

BROMOBENZENE

| | | |
|---|---|---|
| nd = 1.55977 | v = 29.11 | (nd − 1)/v = 0.01923 |
| nd − ng = 0.02580 | Δ nd = −0.01730 | Δ (nd − 1)/v = −0.00033, | where ng is the index of refraction at the mercury (Hg) g-line wavelength (435.84 nm)

To correct the c-line and F-line, the above-mentioned example combinations are preferable.

Control means for controlling the actuator 40 includes a sensor 41 for detecting the inclination angle of the whole imaging lens and system, and a controller 42 for controlling the actuator 40 based on the output of this sensor 41, so that the third transparent plate 33 is moved.

The sensor 41 is adapted to measure the inclination of the whole lens system in a spatial coordinate where the subject is present. For example, it detects a deviation between a stabilized position of a gyroscope and the lens system.

Figure 2:
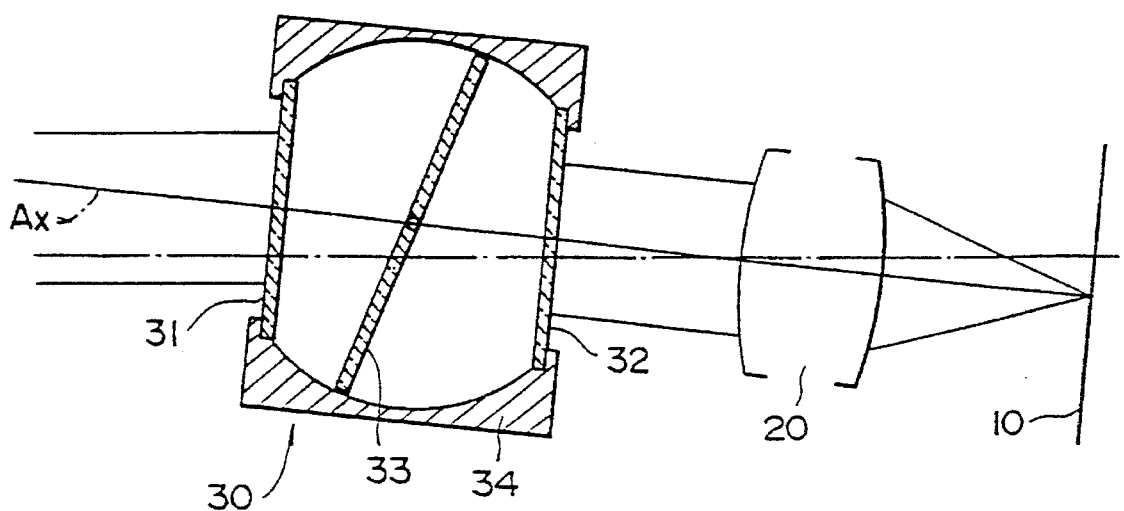
FIG. 2 is a schematic view showing operation of the invention when an optical system of FIG. 1 is inclined.

According to the above-mentioned construction, in case the lens system is inclined as shown in FIG. 2, an image on the image receiving surface 10 is displaced. At the same time the sensor 41 detects the inclination and the controller 42 causes the third transparent plate 33 to be inclined through the actuator 40 in order to correct the displacement of the image on the image receiving surface 10.

In the above-mentioned example, it is constructed such that light flux is deflected by the optical path deflecting portion 30 in a single plane. However, the displacement of the image can be corrected relative to inclination in any direction by the following construction.

One construction is that two optical path deflecting portions like that of the above embodiment are provided in such a manner that pivot axes of the respective central transparent plates are perpendicular to each other.

Another construction is that a ring pivotable on a pivot axis 33a is disposed within the framework 34 of the above-mentioned embodiment and a third transparent plate 33 pivotable on an axis perpendicular to the pivot axis 33a is disposed within this ring.

Next, examples of a lens design to which the optical path deflecting portion is applied will be described.

Figure 3:
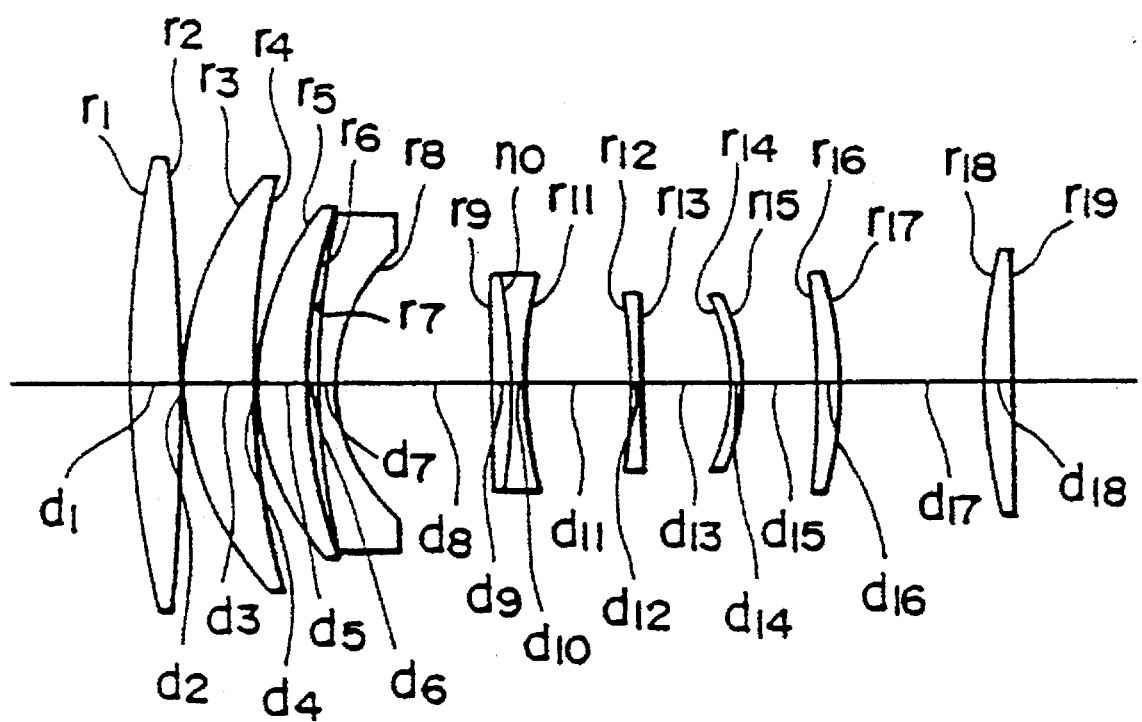
FIG. 3 is a sectional view of a telephoto lens suitable for use with a prism of a first embodiment.

The example shown in FIG. 3 is a telephoto lens of FNo. 2.8 having a focal length of 200 mm which is suitable to employ a prism, and concrete numerical construction thereof is as shown in table 1.

In the table, the reference character FNO, denotes the F number, f denotes a focal length, ω denotes a half field angle, r denotes the radius of curvature of a surface, d denotes a lens thickness or a spatial distance, nd denotes a refractive index in a d-line (wavelength of 588 nm) of a lens, ν denotes an Abbe number.

Figure 4:
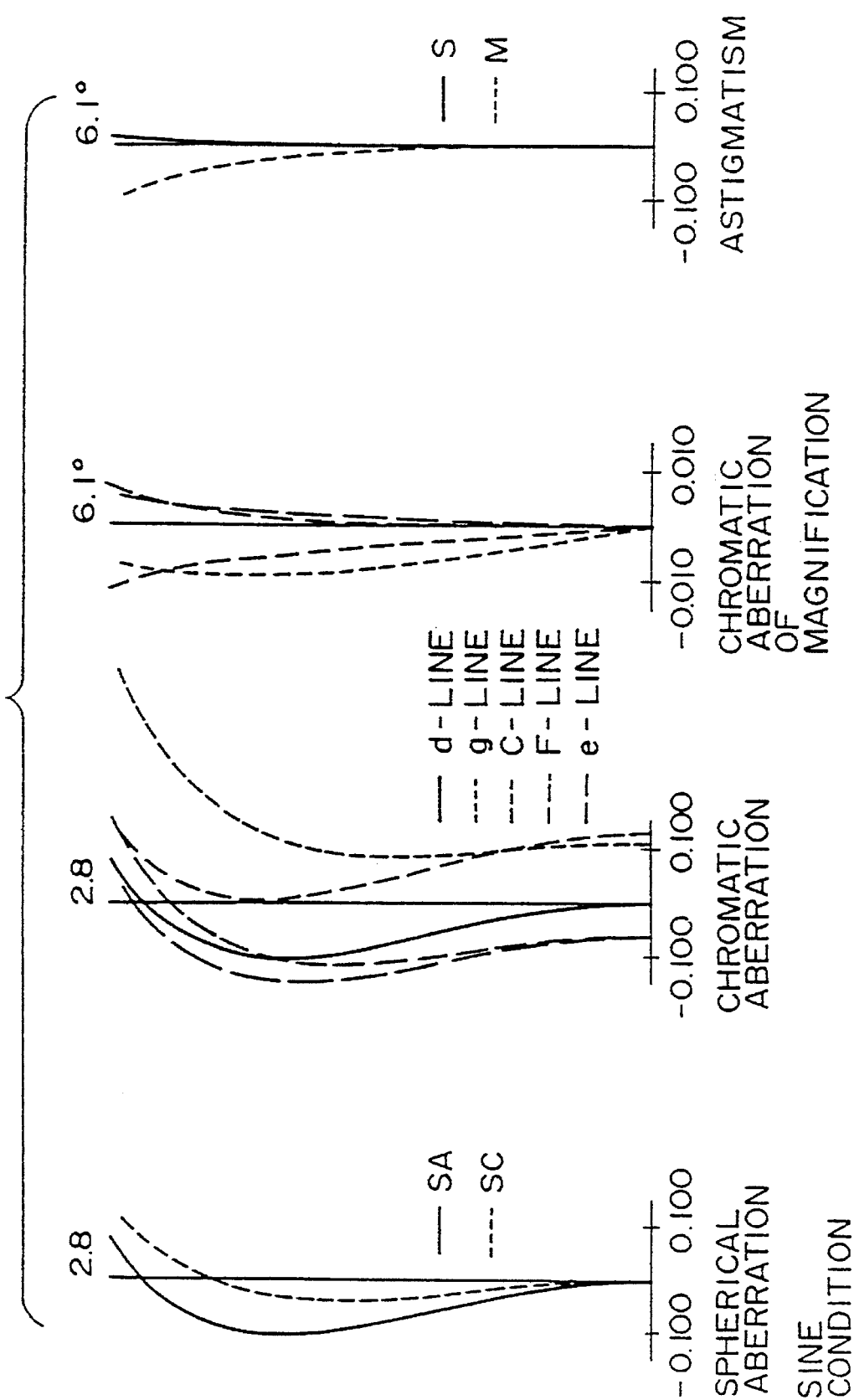
FIG. 4 shows aberration diagrams of the lens shown in FIG. 3.

FIG. 4 shows the aberrations of the telephoto lens alone according to the above-mentioned construction, and FIGS. 5(a) to 5(c) show spot diagrams with the d-line, g-line, o-line and F-line on the image receiving surface 10. In these figures, a vertical broken ling denotes Y axis, a horizontal broken line denotes Z axis. The coordinate of intersection between two broken lines are (y,z)=(−21.6,0) in FIG. 5(a), (0,0) in FIG. 5(b), and (21.6,0) in FIG. 5(c).

TABLE 1

| FNo. = 1:2.8  f = 200.00  ω = 6.1° | | | | |
|---|---|---|---|---|
| surface No. | r | d | nd | ν |
| 1 | 142.414 | 8.84 | 1.48749 | 70.2 |
| 2 | −297.975 | 0.20 | | |
| 3 | 47.426 | 11.74 | 1.56907 | 71.3 |
| 4 | 155.076 | 0.50 | | |
| 5 | 45.365 | 7.08 | 1.56907 | 71.3 |
| 6 | 80.705 | 2.00 | | |
| 7 | 142.660 | 2.50 | 1.62588 | 35.7 |
| 8 | 29.214 | 24.11 | | |
| 9 | 373.239 | 3.20 | 1.78300 | 36.1 |
| 10 | −127.548 | 2.00 | 1.77250 | 49.6 |
| 11 | 63.192 | 16.84 | | |
| 12 | −107.766 | 2.00 | 1.51633 | 64.1 |
| 13 | 1895.170 | 13.74 | | |
| 14 | −30.559 | 2.00 | 1.48749 | 70.2 |
| 15 | −34.201 | 12.24 | | |
| 16 | −263.495 | 3.72 | 1.48749 | 70.2 |
| 17 | −63.294 | 23.81 | | |
| 18 | 82.536 | 5.00 | 1.48749 | 70.2 |
| 19 | −541.377 | | | |

Figure 6:
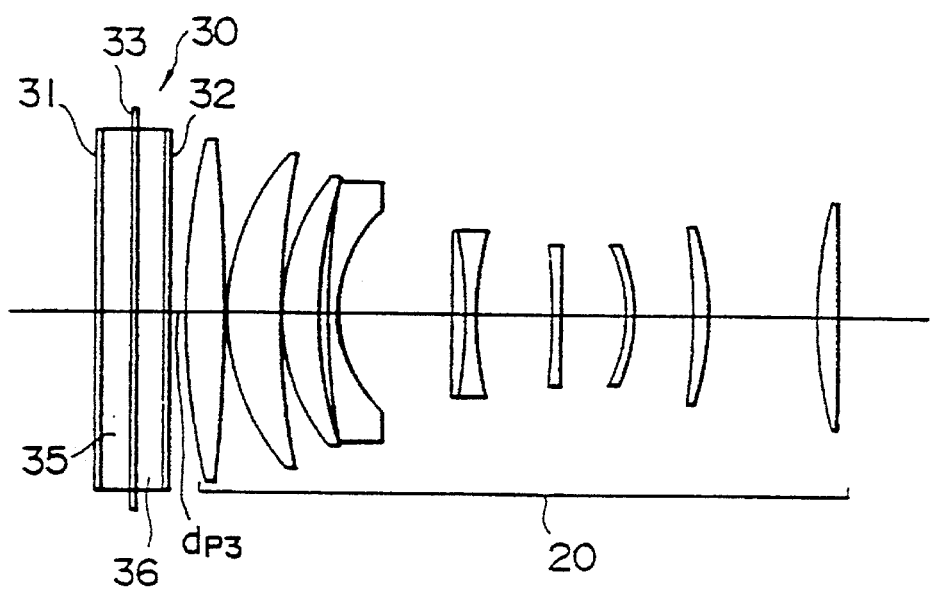
FIG. 6 is a sectional view of the lens of FIG. 3 showing one example in which an optical path deflecting portion is provided in a subject side of the lens.
Figure 7:
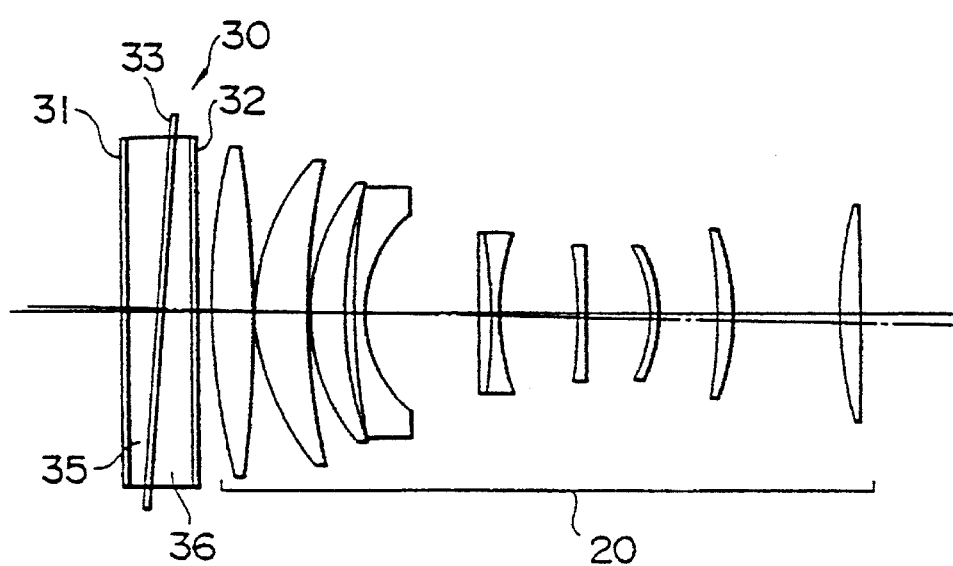
FIG. 7 is a sectional view of the lens of FIG. 6 which is now in its inclined state.

FIG. 6 shows the above mentioned telephoto lens combined with the optical path deflecting portion 30. The optical path deflecting portion 30 is disposed on the most extreme side to the subject in the lens system and formed of two liquid prisms 35 and 36. The construction of the optical path deflecting portion 30 is as shown in table 2 and a distance dP3=3.00 mm from the final (P3) surface of the prism to the first surface r1 of the lens. Since the transparent plate itself does not affect the image quality, the thickness of the transparent plate is optional.

TABLE 2

| | d | nd | ν |
|---|---|---|---|
| First transparent plate | optional | | |
| BENZYLAMINE | 8.00 | 1.54406 | 31.05 |
| Third transparent plate | optional | | |
| ACETYLACETONE | 8.00 | 1.45178 | 25.76 |
| Second transparent plate | optional | | |

In case the optical system inclines by 0.5° in a direction that the subject side thereof (the left-hand side of the lens system in FIG. 7) displaced downward, the displacement of the image is 1.75 mm when the optical path deflecting portion is not acted. But the displacement of the image can be canceled by inclining the third transparent plate 33 to set the apex angles of the liquid prisms to 5.403°. FIG. 8 shows the spot diagram when the optical path deflecting portion has acted, wherein the coordinates of the respective FIGS. 8(a) to (8c) are the same to those of FIG. 6.

In FIG. 8, the spot group displaced downward in the coordinate is an image with the g-line. Deterioration in image quality is hardly occurred between the c-line to F-line including the displacement of a spot image outside the axis but excluding the image with this g-line.

In this embodiment, since the main purpose is to minimize the value of Δ (nd−1)/ν, the image drawn by the g-line is displaced. In order to reduce the displacement of the g-line image, it is preferable to select a combination of liquid which has a small difference in nd-ng {where ng is the index of refraction at the mercury (Hg) g-line wavelength (435.84 nm)} and is not excessively large in Δ (nd−1)/ν. For example, a combination between phenol and acetylacetone, and a combination between bromobenzene and acetylacetone may be selected.

SECOND EMBODIMENT

An image stabilizing apparatus of the second embodiment is characterized in that plural prisms are arranged such that a light incident surface of the incident side prism and the outgoing surface of the outgoing side prism are respectively vertical to an optical axis of the imaging optical system. When the imaging optical system is inclined, there can be obtained a static image by pivoting the prisms on the optical axis depending on the angle of inclination.

Figure 9A:
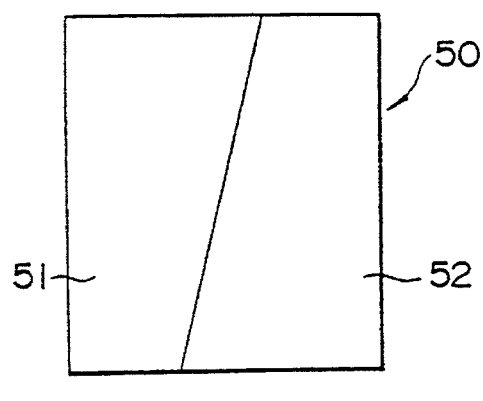
FIGS. 9(a) to 9(c) are schematic views showing prisms which are used in a second embodiment of the image stabilizing apparatus of the present invention.

FIG. 9(a) Shows a prism 50 in which chromatic aberration is corrected by cementing two prism bodies 51 and 52 of solid materials together. The light incident and outgoing surfaces of the prism 50 are formed in parallel relation, and the vertex angles of the two prisms are equal to each other. If the respective prism bodies use a combination of glass listed below, which satisfies the following condition, $$(nd1-1)/v1 \doteq (nd2-1)/v2,$$

wherein the refractive index and Abbe number of the first prism body 51 are represented by nd1 and v1, and the refractive index and Abbe number of the second prism bodies 52 are represented by nd2, v2, there can be obtained a deflecting function with a comparatively small vertex angle. The following names of the glass materials are merchandise names of Kabushiki Kaisha Ohara.

<EXAMPLE OF FIRST COMBINATION>
LaSF08

| | | |
|---|---|---|
| nd = 1.88300 | v = 40.76 | (nd − 1)/v = 0.02166 |
| SF5 | | |
| nd = 1.67270 | v = 32.10 | (nd − 1)/v = 0.02095 |
| Δ nd = 0.21030 | Δ (nd − 1)/v = 0.00071 | |

<EXAMPLE OF SECOND COMBINATION>
LaSF015

| | | |
|---|---|---|
| nd = 1.80400 | v = 46.57 | (nd − 1)/v = 0.01726 |
| F16 | | |
| nd = 1.59270 | v = 35.29 | (nd − 1)/v = 0.01679 |
| Δ nd = 0.21130 | Δ (nd − 1)/v = 0.00047 | |

<EXAMPLE OF THIRD COMBINATION>
LaSF09

| | | |
|---|---|---|
| nd = 1.81600 | v = 46.62 | (nd − 1)/v = 0.01750 |
| F1 | | |
| nd = 1.62588 | v = 35.70 | (nd − 1)/v = 0.01754 |
| Δ nd = 0.19012 | Δ (nd − 1)/v = 0.00004 | |

<EXAMPLE OF FOURTH COMBINATION>
LaSF014

| | | |
|---|---|---|
| nd = 1.78800 | v = 47.43 | (nd − 1)/v = 0.01663 |
| F16 | | |
| nd = 1.59270 | v = 35.29 | (nd − 1)/v = 0.01679 |
| Δ nd = 0.19530 | Δ (nd − 1)/v = −0.00016 | |

As a solid material, by means of proper combination including not only glass but also plastic as shown below, there can be obtained a width in selection of the Abbe number and refractive index.

<EXAMPLE OF FIFTH COMBINATION>
LaSF03

| | |
|---|---|
| nd = 1.80610 | v = 40.95 |
| (nd − 1)/v = 0.01969 | |
| Polycarbonate | |
| nd = 1.58547 | v = 29.90 |
| (nd − 1)/v = 0.01958 | |
| Δ nd = 0.22063 | Δ (nd − 1)/v = 0.00011 |

<EXAMPLE OF SIXTH COMBINATION>
LaSF02

| | |
|---|---|
| nd = 1.79952 | v = 42.24 |
| (nd − 1)/v = 0.01893 | |
| Polystyrene | |
| nd = 1.59048 | v = 30.90 |
| (nd − 1)/v = 0.01911 | |
| Δ nd = 0.20904 | Δ (nd − 1)/v = −0.00018 |

Figure 9B:
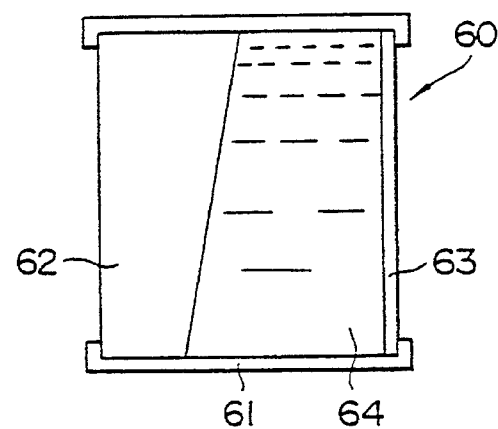

FIG. 9(b) shows a prism 60 in which a solid body and a liquid body are used as material of the prism body, in which a solid first prism 62 is fixed to one side of the framework 61 serving as a light incident and outgoing surface. Also, a plane parallel plate 63 is fixed to the other side of the framework 61, and a liquid is filled in a chamber formed between the first prism 62 and the plane parallel plate 63, thereby to form a second prism 64.

As a combination between the solid material of the first prism 62 and a liquid material of the second prism 64, if a combination between the glass and liquid body satisfying the following condition, $(nd1-1)/v1 \doteq (nd2-1)/v2$, there can be obtained a large deflecting function with a comparatively small apex angle.

<EXAMPLE OF SEVENTH COMBINATION>
LaSK02

| | | |
|---|---|---|
| nd = 1.78650 | v = 60.00 | (nd − 1)/v = 0.01573 |
| Toluene | | |
| nd = 1.49782 | v = 31.07 | (nd − 1)/v = 0.01602 |
| Δ nd = 0.28868 | Δ (nd − 1)/v = −0.00029 | |

<EXAMPLE OF EIGHTH COMBINATION>
LaF010

| | | |
|---|---|---|
| nd = 1.74320 | v = 49.31 | (nd − 1)/v = 0.01507 |
| Benzene | | |
| nd = 1.47439 | v = 31.82 | (nd − 1)/v = 0.01491 |
| Δ nd = 0.26881 | Δ (nd − 1)/v = 0.00016 | |

Figure 9C:
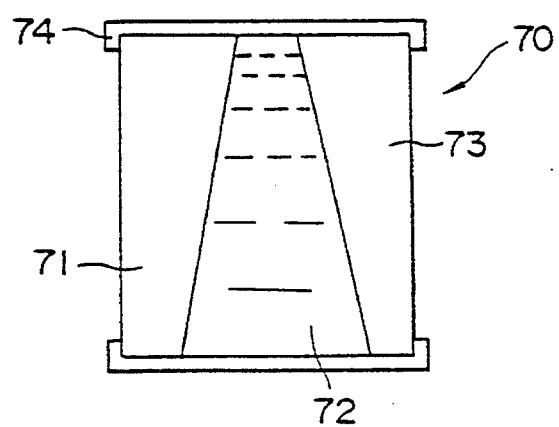

FIG. 9(c) shows a prism 70 having first and third prisms 71 and 73 of a solid material and a second prism 72 of a liquid material. The first and third prisms 71 and 73 are fixed to both ends in the light incident and outgoing direction of the framework 74, and a liquid is filled in a chamber formed therebetween, thereby to form the second prism 72. When prisms of a solid mateiral are cemented with each other, especially when the solid materials are extremely different in coefficient of thermal expansion such as glass and plastic, deformation tends to occur owing to temperature change. As shown in this example, when an intermediate prism is formed of a liquid material, generation of deformation owing to temperature change can be prevented even when the coefficient of thermal expansion is greatly different.

Preferably, the same material is used for the first and third prisms and a material having a different Abbe number from these is used for the second prism.

Figure 10:
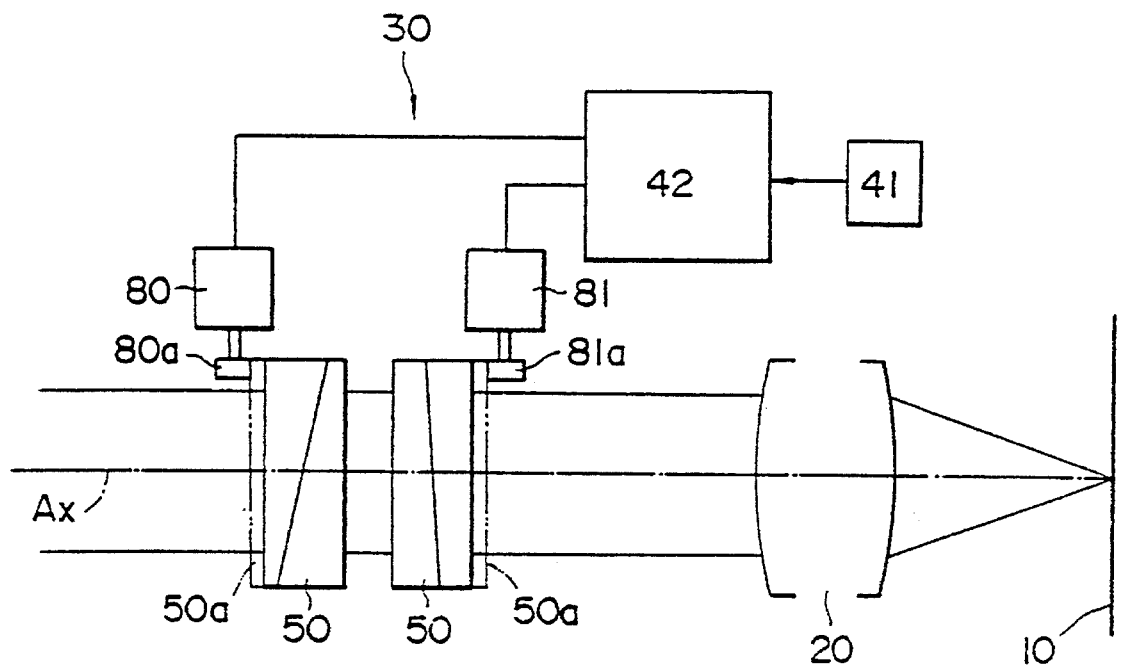
FIG. 10 is a schematic view showing the image stabilizing apparatus of the second embodiment.

FIG. 10 shows one embodiment of an image stabilizing optical system in which two sets of prisms 50 are used.

The optical system used in this embodiment includes an imaging lens system 20 for forming an image on the image receiving surface 10, and an optical path deflecting portion 30 for correcting the displacement of the image relative to the inclination of the whole optical system.

The optical path deflecting portion 30 includes two prisms 50, 50 pivotably supported on an optical axis Ax of the imaging lens 20. The outer periphery of the prism 50 is provided with gears 50a, 50a with which drive gears 80a, 81a mounted on the rotational shafts of the motors 80 and 81 are meshed. By virtue of the foregoing construction, the prisms 50, 50 are pivoted by the motors 80 and 81, respectively to deflect the optical path in order to correct the displacement of the image caused by inclination of the whole optical system.

Means for controlling the motors 80 and 81 may, like the example shown in FIG. 1, include a sensor 41 and a controller 42.

According to the above-mentioned construction, when the lens system is inclined, the sensor 41 detects the inclination, and the controller 42 pivots the prisms 50, 50 through the motors 80 and 81 in order to correct the displacement of the image on the image receiving surface 50.

Next, lens design examples to which the above-mentioned prism is applied will be described.

Figure 11:
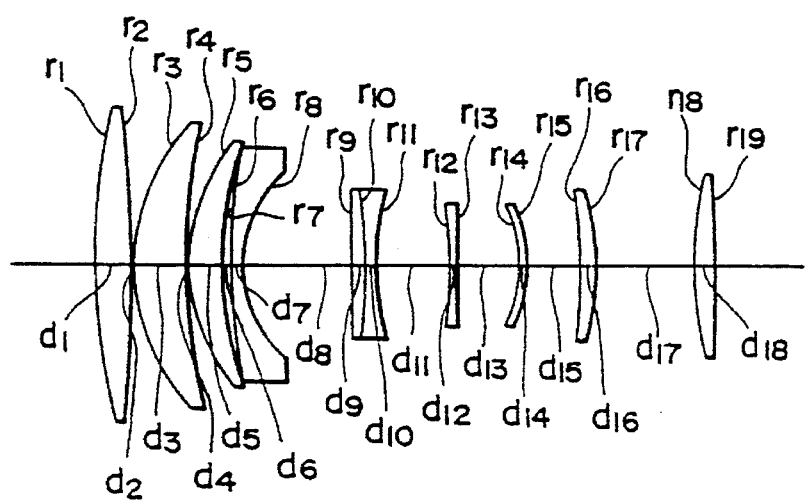
FIG. 11 is a sectional view of a telephoto lens which is suitable for use with the prism of the image stabilizing apparatus of the second embodiment.

The example shown in FIG. 11 is a telephoto lens of FNo. 2.8 having a focal length of 200 mm which is suitable to employ a prism, and concrete numerical construction thereof is as shown in table 3.

Figure 12:
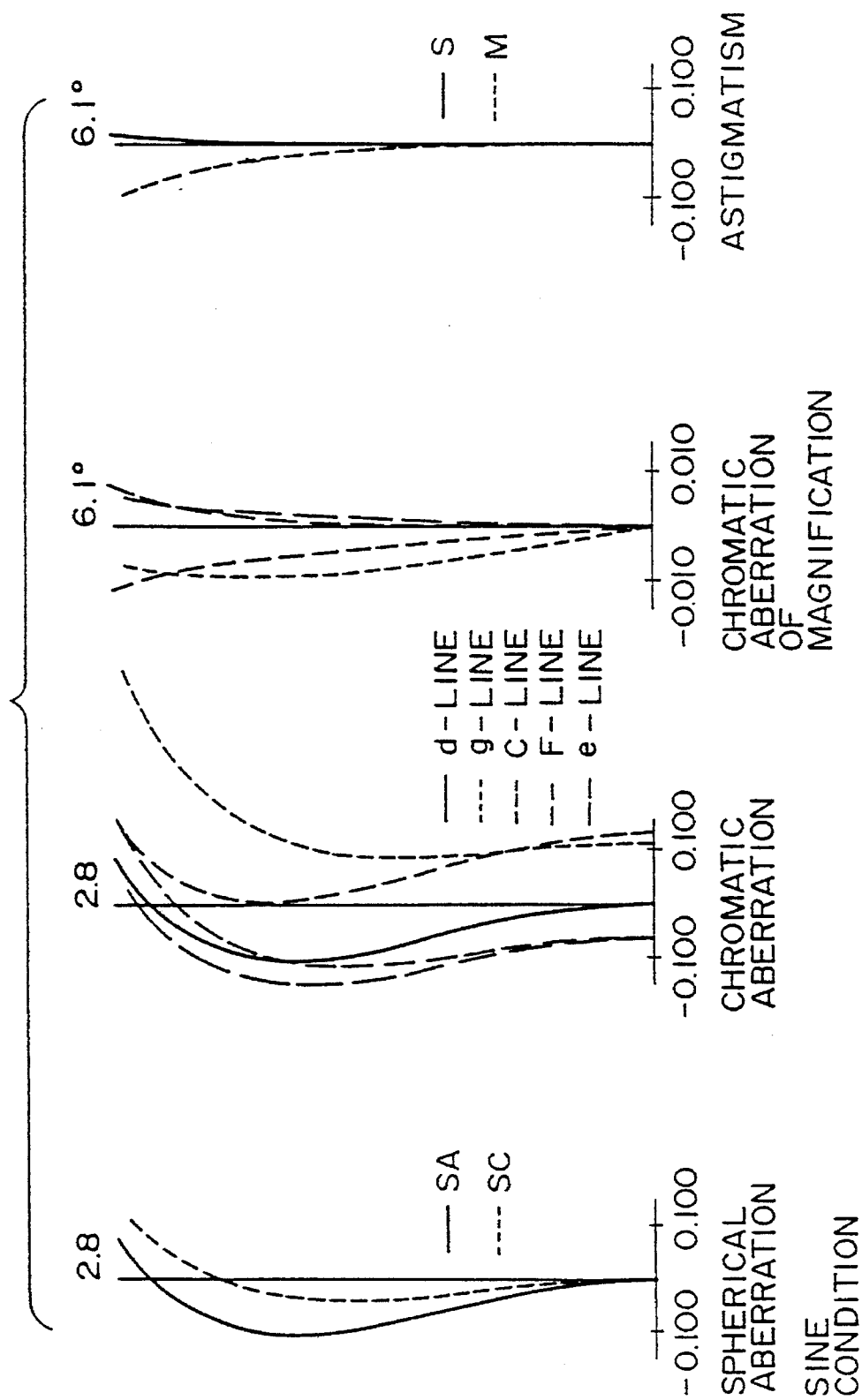
FIG. 12 shows aberration diagrams of the lens shown in FIG. 11.
Figure 13:
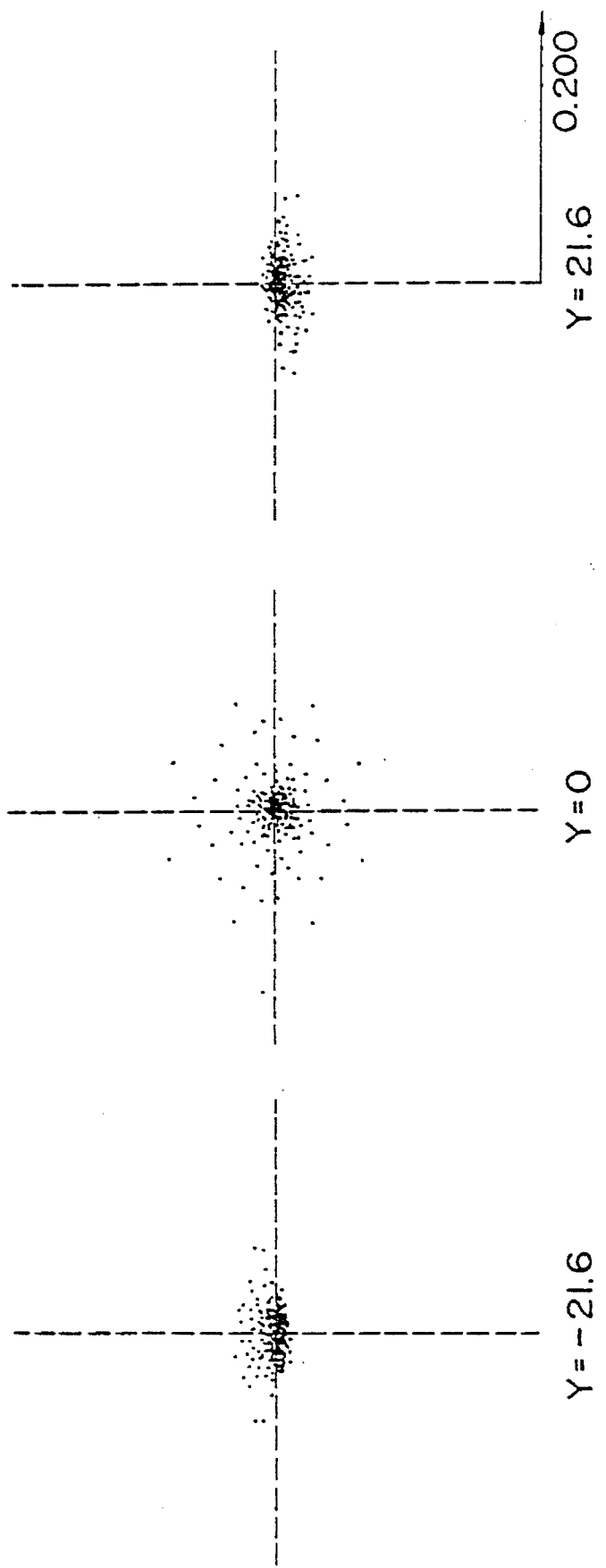
FIGS. 13(a) to 13(c) are spot diagrams of the lens shown in FIG. 11.

FIG. 12 shows the aberration of the telephoto lens alone according to the above-mentioned construction. FIGS. 13(a)

to 13(c) show spot diagrams at three positions. Coordinates of FIGS. 13(a) to 13(c) are the same to those of FIG. 5.

TABLE 3

FNo. = 1:2.8  f = 200.00  W = 6.1°

| Surface No. | r | d | nd | v |
|---|---|---|---|---|
| 1 | 142.414 | 8.81 | 1.48749 | 70.2 |
| 2 | −297.975 | 0.20 | | |
| 3 | 47.426 | 11.74 | 1.56907 | 71.3 |
| 4 | 155.076 | 0.50 | | |
| 5 | 45.365 | 7.08 | 1.56907 | 71.3 |
| 6 | 80.705 | 2.00 | | |
| 7 | 142.660 | 2.50 | 1.62588 | 35.7 |
| 8 | 29.214 | 24.11 | | |
| 9 | 373.239 | 3.20 | 1.78300 | 36.1 |
| 10 | −127.548 | 2.00 | 1.77250 | 49.6 |
| 11 | 63.192 | 16.84 | | |
| 12 | −107.766 | 2.00 | 1.51633 | 64.1 |
| 13 | 1895.170 | 13.74 | | |
| 14 | −30.559 | 2.00 | 1.48749 | 70.2 |
| 15 | −34.201 | 12.24 | | |
| 16 | −263.495 | 3.72 | 1.48749 | 70.2 |
| 17 | −63.294 | 23.81 | | |
| 18 | 82.536 | 5.00 | 1.48749 | 70.2 |
| 19 | −541.377 | | | |

Two examples of the telephoto lens provided with the optical path deflecting portion will be described.

The optical path deflecting portion is preferably disposed in a portion where the light flux becomes generally afocal in the optical path. In the example shown in FIG. 14, the optical path deflecting portion is disposed at the subject side of the lens system 20, and in the example shown in FIG. 16, the same is disposed at a portion near to afocal in the lens system.

Figure 14:
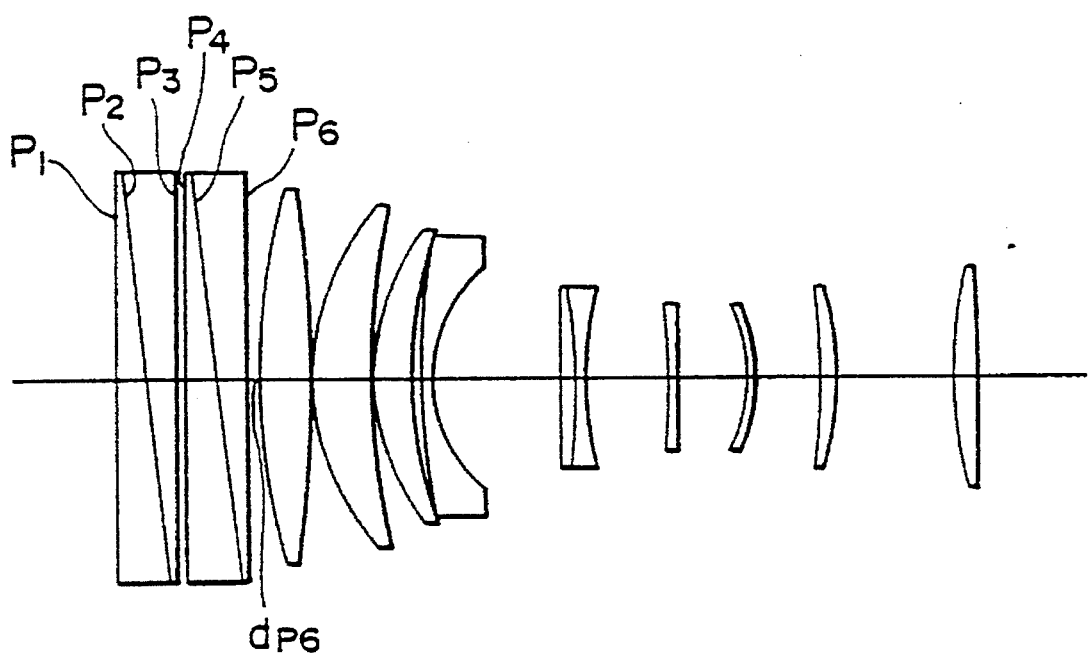
FIG. 14 is a sectional view showing one example of a lens which is provided with an optical path deflecting portion at its intermediate portion.

The telephoto lens shown in FIG. 14 has an optical path deflecting portion formed of two prisms disposed at the subject side of the lens system 20. The numerical construction of the optical path deflecting portion is as shown in Table 4, and has a distance dP6=3.00 mm from the final (P6) surface of the prism to the first surface of the lens.

TABLE 4

| Surface No. | d | nd | v | glass material |
|---|---|---|---|---|
| P1 | 6.00 | 1.88300 | 40.8 | LaSF08 |
| P2 | 6.00 | 1.67270 | 32.1 | SF5 |
| P3 | 2.00 | | | |
| P4 | 6.00 | 1.67270 | 32.1 | SF5 |
| P5 | 6.00 | 1.88300 | 40.8 | LaSF08 |
| P6 | 3.00 | | | |

Figure 15:
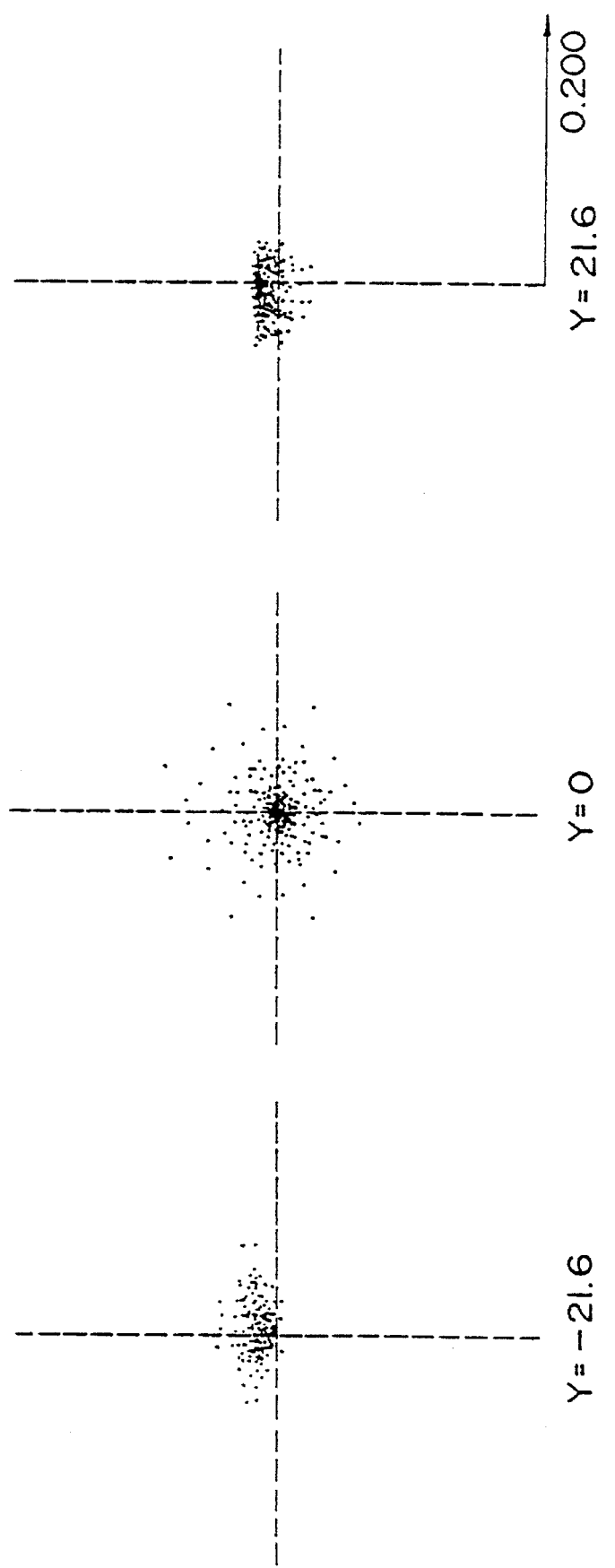
FIGS. 15(a) to 15(c) are spot diagrams according to the construction of FIG. 14.

In case the optical system inclines by 0.5° in a direction that the subject side thereof displaced downward, the displacement of the image is 1.75 mm when the optical path deflecting portion is not acted. But the displacement of the image can be corrected by pivoting the first and second prisms in reversal directions by 103.71°. FIGS. 15(a) to 15(c) show the spot diagrams when the optical path deflecting portion has acted, wherein the coordinates of the respective FIGS. 15(a) to 15(c) are the same to those of FIG. 5.

Figure 16:
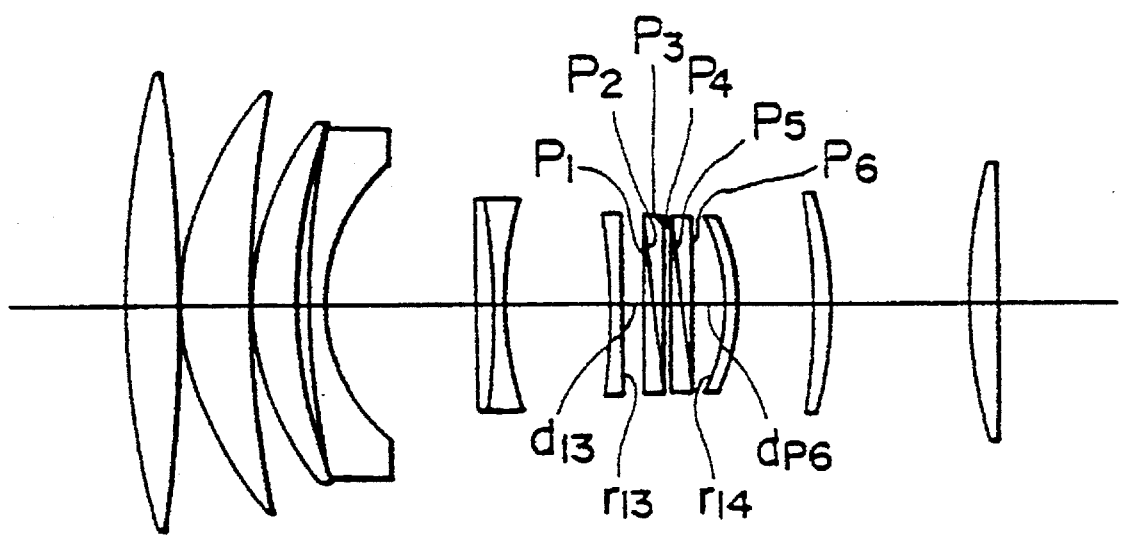
FIG. 16 is a sectional view showing one example of the lens of FIG. 11 which is provided with an optical path deflecting portion at its intermediate portion.

FIG. 16 shows an example of the telephoto lens shown in FIG. 11 provided with an optical path deflecting portion formed of two prisms and disposed between a thirteen surface and a fourteen surface thereof. The numerical construction of the optical path deflecting portion is as shown in Table 5 and has distance d13=3.00 mm from the thirteen surface of the lens to the P1 surface of the prism and a distance dP6=5.22 mm from the P6 surface of the prism to the fourteen surface of the lens.

TABLE 5

| Surface No. | d | nd | v | glass material |
|---|---|---|---|---|
| P1 | 2.00 | 1.88300 | 40.8 | LaSF08 |
| P2 | 2.00 | 1.66680 | 33.0 | SF19 |
| P3 | 1.00 | | | |
| P4 | 2.00 | 1.66680 | 33.0 | SF19 |
| P5 | 2.00 | 1.88300 | 40.8 | LaSF08 |
| P6 | 5.22 | | | |

In case the optical system inclines by 0.5° in a direction that the subject side thereof displaces downward, the displacement of the image can be corrected by pivoting the first and second prisms in reversal directions by 127.30°. FIGS. 17(a) to 17(c) show the spot diagrams when the optical path deflecting portion has acted, wherein the coordinates of the respective FIGS. 17(a) to 17(c) are the same to those of FIG. 5.

In case the optical path deflecting portion is disposed in the lens system as shown in FIG. 16, the generating quantity of the chromatic aberration is not necessarily minimum when the following condition is satisfied.

$$(nd1-1)/v1=(nd2-1)/v2$$

However, the chromatic aberration is minimum in quantity in a region where following condition is satisfied.

$$(nd1-1)/v1 \doteq (nd2-1)/v2$$

According to the second embodiment, there can be provided a prism, in which chromatic aberration is small, a change of the outward form caused by pivot is small, and an arrangement space can be obtained with ease when this is used as a vibration-proof optical system.

THIRD EMBODIMENT

An image stabilizing apparatus according to a third embodiment is characterized in that two movable prisms are set such that an angle θ formed by an axis indicating the deflecting function of the prism becomes 45°<θ<135° in its initial state.

According to such construction as mentioned above, as vector of image displacement caused by micro pivot from the initial states of the first and second prisms is not coincident with a straight line, correction can be instantaneously made for displacement of an image in any direction.

Also, in case the amount of the deflecting functions of both prisms are the same, the displacement of the image can be corrected only by pivoting by an angle proportional to the displacement component of the image differentially, and the control of the pivot of prisms becomes easy.

Figure 18:
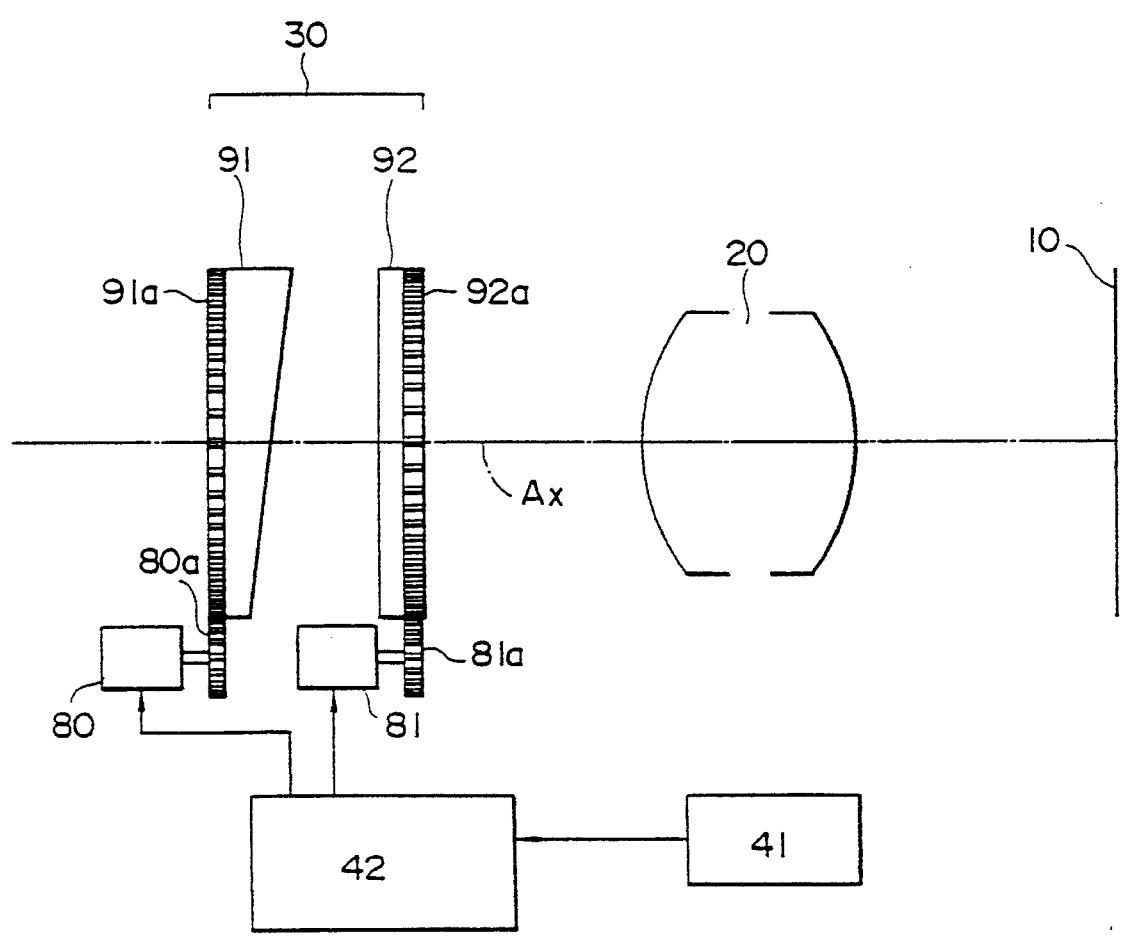
FIG. 18 is a schematic view showing a third embodiment of an image stabilizing apparatus according to the present invention.
Figure 19:
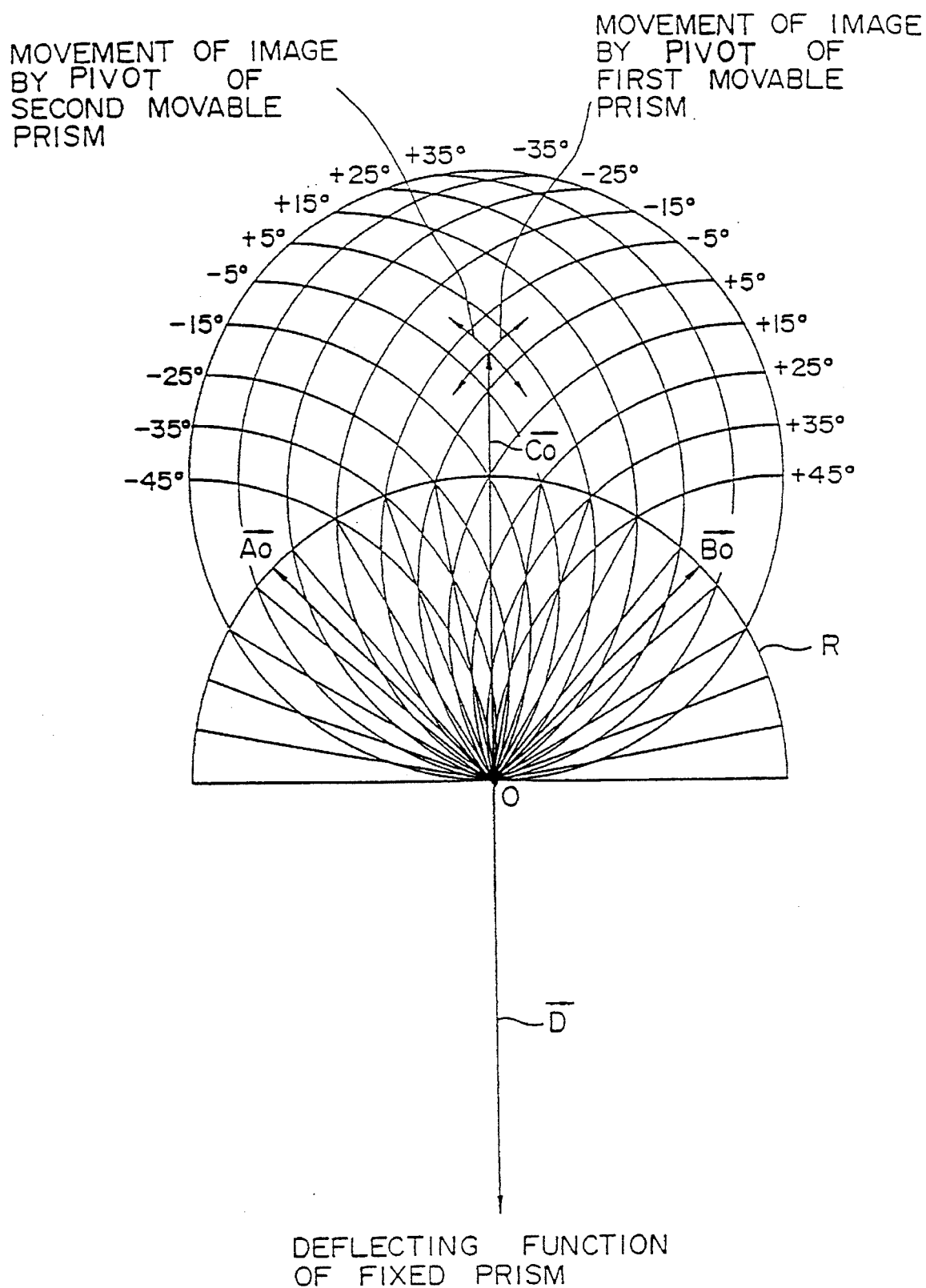
FIG. 19 is a schematic view showing the deflecting function caused by a prism of the image stabilizing apparatus of the third embodiment.
Figure 20:
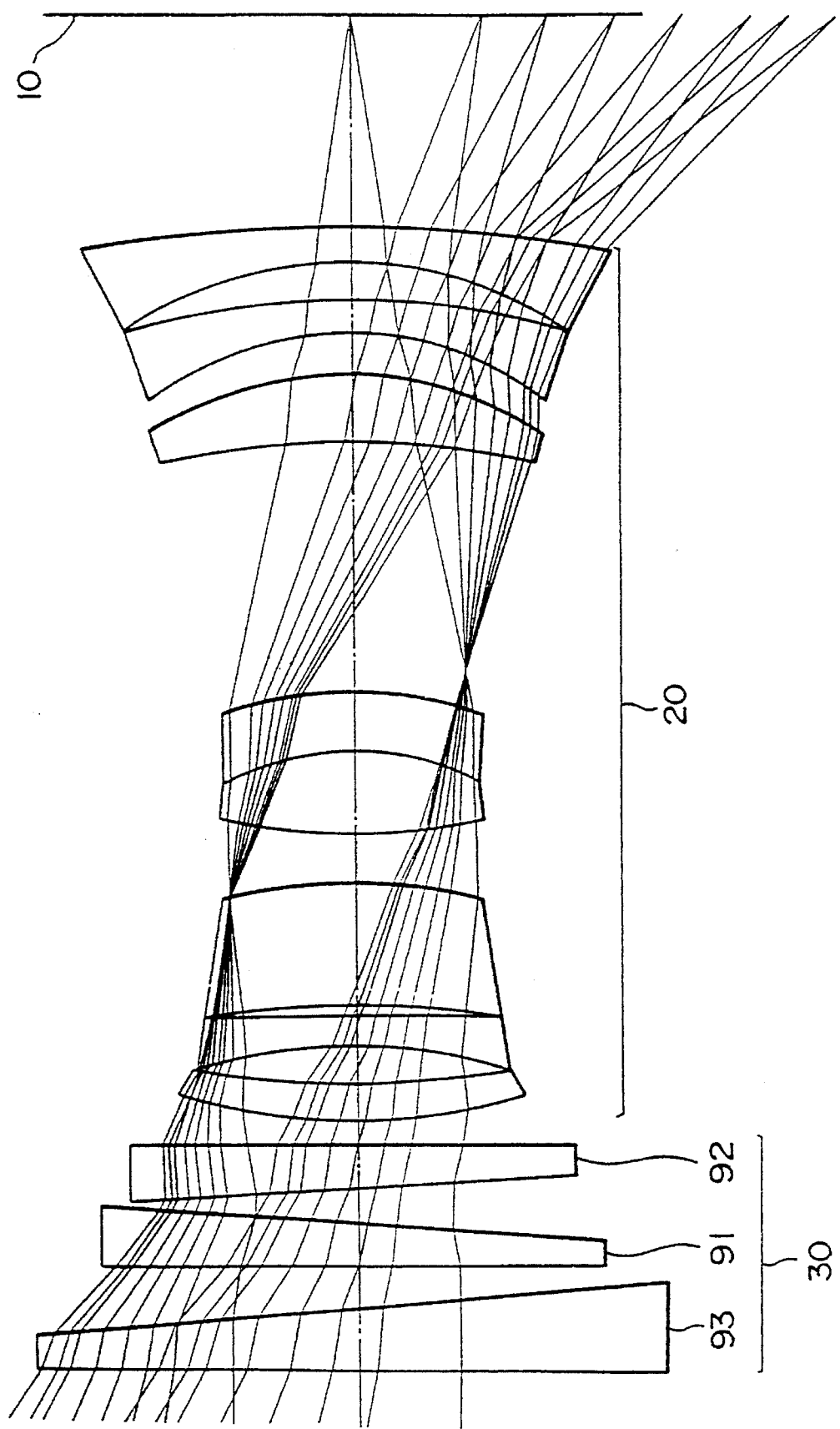
FIG. 20 is a sectional view of a lens showing a concrete example of a taking lens system which is provided with the image stabilizing apparatus of the third embodiment.

FIGS. 18 through 20 show the image stabilizing apparatus according to the third embodiment.

The general construction of this apparatus will be described first with reference to FIG. 18.

An optical system shown in this embodiment includes an imaging lens system 20 for forming an image of a image receiving surface 10, and an optical path deflecting portion 30.

The optical path deflecting portion 30 includes first and second movable prisms 91 and 92 which are pivotably supported on an optical axis Ax of the imaging lens system 20. These movable prisms are arranged such that an angle θ formed by an axis indicating the deflecting function is $45°<\theta<135°$ in its initial states.

These movable prisms 91 and 92 are provided on outer peripheries thereof with gears 91a and 92a with which drive gears 80a and 81a mounted on pivoting axis of motors 80 and 81 as a pivot mechanism are meshed. Owing to the foregoing construction, the two prisms are pivoted by the corresponding motors 80 and 81 respectively to deflect the optical path and prevent the displacement of the image caused by inclination of the whole optical system.

Control means for controlling the motors 80 and 81 includes a sensor 41 and a controller 42.

According to the above-mentioned construction, in case the lens system is inclined, the sensor 41 detects the inclination, the controller 42 pivots the prisms 91 and 92 through the motors 80 and 81 to correct the displacement of the image on the image receiving surface 10.

A signal for controlling the pivot of the movable prisms is produced by a calculation utilizing the angular position of pivot of the prisms.

Next, displacement of an image caused by pivot of the two movable prisms will be described with reference to FIG. 19. FIG. 19 shows an example in which an angle $\theta$ formed by the deflecting function of respective prisms is arranged to $\theta=90°$, and the amount of the deflecting function of the two prisms are equal to each other.

The origin O of FIG. 19 is a point of intersection between the optical axis of the lens system and the image receiving surface 10, and the vector AO and vector BO express the initial deflecting functions of the first and second prisms. A vector CO expresses the composed deflecting function of the two prisms in their initial status.

When the first and second prisms are pivoted, the vectors indicating the deflecting functions of the respective prisms are pivoted on the origin O. Terminal points of the vectors are points on a circular arc R. In the drawing, the respective circular arcs drawn by thin lines in the drawing are coordinates for explaining the vectors composing the deflecting function caused by the two prisms, the radius is the same for the vectors AO and BO, and the center is a spot divided by 10° unit on the circular arc R.

In the Figure, the respective circular arcs indicated with angles are used as a coordinate for explaining the vector composed of the deflecting functions of the two prisms. The radius of each reference arc is the same for the vectors AO and BO, and the centers thereof are points spaced apart by 10° intervals along the circular arc R.

The reference arc indicated by angles are aggregations of dots which can be the terminal point of the vector indicating the deflecting function composed. The reference arcs of which centers are located on the left-hand side in the coordinate are an aggregation of dots which can be served as a terminal point indicating the deflecting function at the time the vectors AO has pivoted by that angle. Likewise, the reference arcs of which centers are located on the right-hand sides are an aggregation of dots which can be served as a terminal point of the composed vector at the time the vector BO has pivoted by that angle. Therefore, if the angles of pivot for the both prisms are apparent, the deflecting function may be indicated as the vector drawn from the origin O to the point determined by the pivot angles.

As described above, since the directions of the deflecting function of the two prisms are perpendicular to each other, the directions for correcting the image caused by a micro pivot of the respective prisms become components generally perpendicular to each other. The correcting of the image displacement is expressed the vector of which starting point is on the terminal point of the vector CO. Accordingly, by resolving the vector of the displacement of the image into two perpendicular components corresponding to the deflecting function of the respective prisms in their initial states and by pivoting the respective prisms independently based on these components, displacement of the image can be corrected.

However, since the moving directions of the image are not linear components perpendicular to each other but components along the circular arc, an error occurs. However, this error can be reduced within 4% in a region surrounded by arcs indicating angles of pivot ±5° of the both prisms.

By the way, in case the optical path deflecting portion is formed only of two movable prisms, the image is already shifted in its initial state as indicated by the vector CO. However, in case the shift of the image does not become a problem as when used a short focal length lens, there can be obtained a favorable performance if the generation of the chromatic aberration is reduced. At that time, by using a material of a high Abbe number (low dispersion) or by employing a cemented prism as the movable prisms, the chromatic aberration can be corrected.

On the contrary, in case affection due to shift of an image and chromatic aberration of magnification becomes significant as when using a telephoto lens, it may be designed such that a stationary prism having such deflecting function as shown by the vector D is added to the above-mentioned construction. In this construction, the image shift in its initial state can be canceled by the movable prism.

FIG. 20 shows a concrete example of a taking lens provided with an optical path deflecting portion 30 formed of two movable prisms 91 and 92 and a single stationary prism 93 disposed at a subject side of the imaging lens system 20.

In case the Abbe numbers of the movable prisms 91 and 92 and of the stationary prism 93 are the same, the chromatic aberration of magnification can also be corrected by canceling the shift of the image position.

Also, by arranging the stationary prism 93 at the most extreme side to the subject of the lens, it can be prevented that the movable prisms 91 and 92 are touched during operation thereof. Furthermore, in case the chromatic aberration of a prism greatly affects the image efficiency as when used in a telephoto lens, it is preferable that the chromatic aberration is corrected for all prisms.

FOURTH EMBODIMENT

Figure 21:
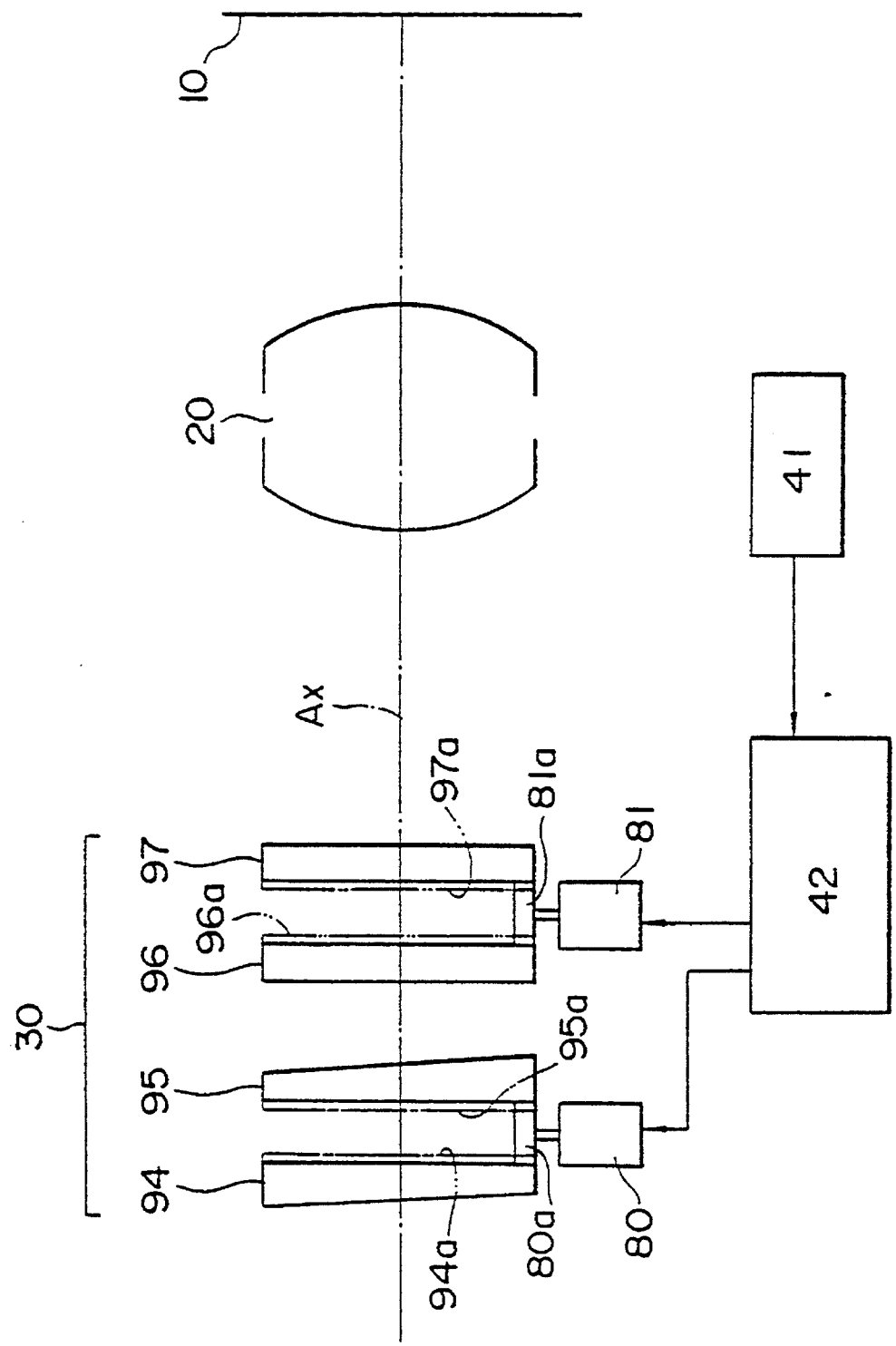
FIG. 21 is a schematic view showing a fourth embodiment of the image stabilizing apparatus according to the present invention.
Figure 22:
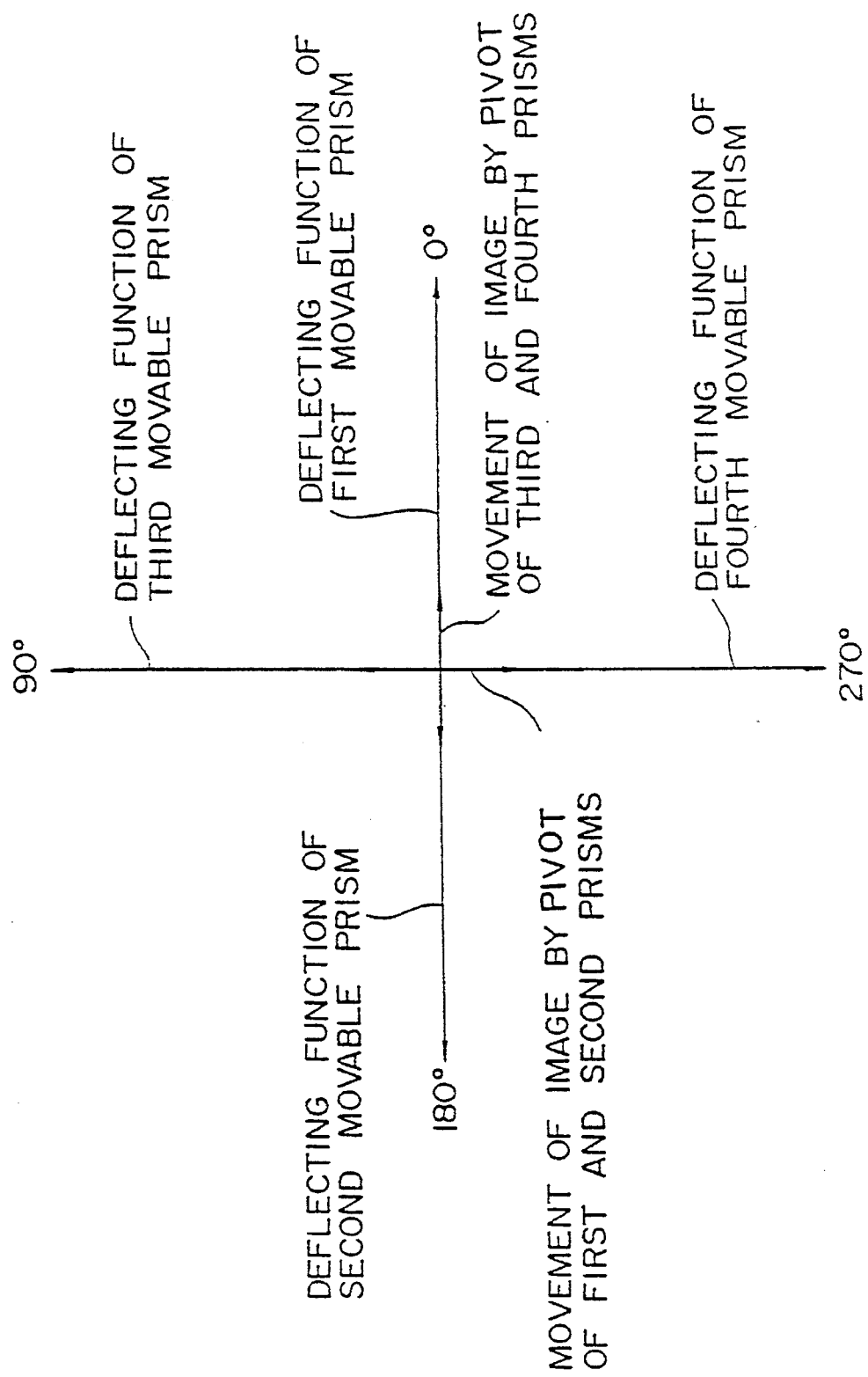
FIG. 22 is a schematic view showing the deflecting function caused by a prism of an image stabilizing apparatus of the fourth embodiment.
Figure 23:
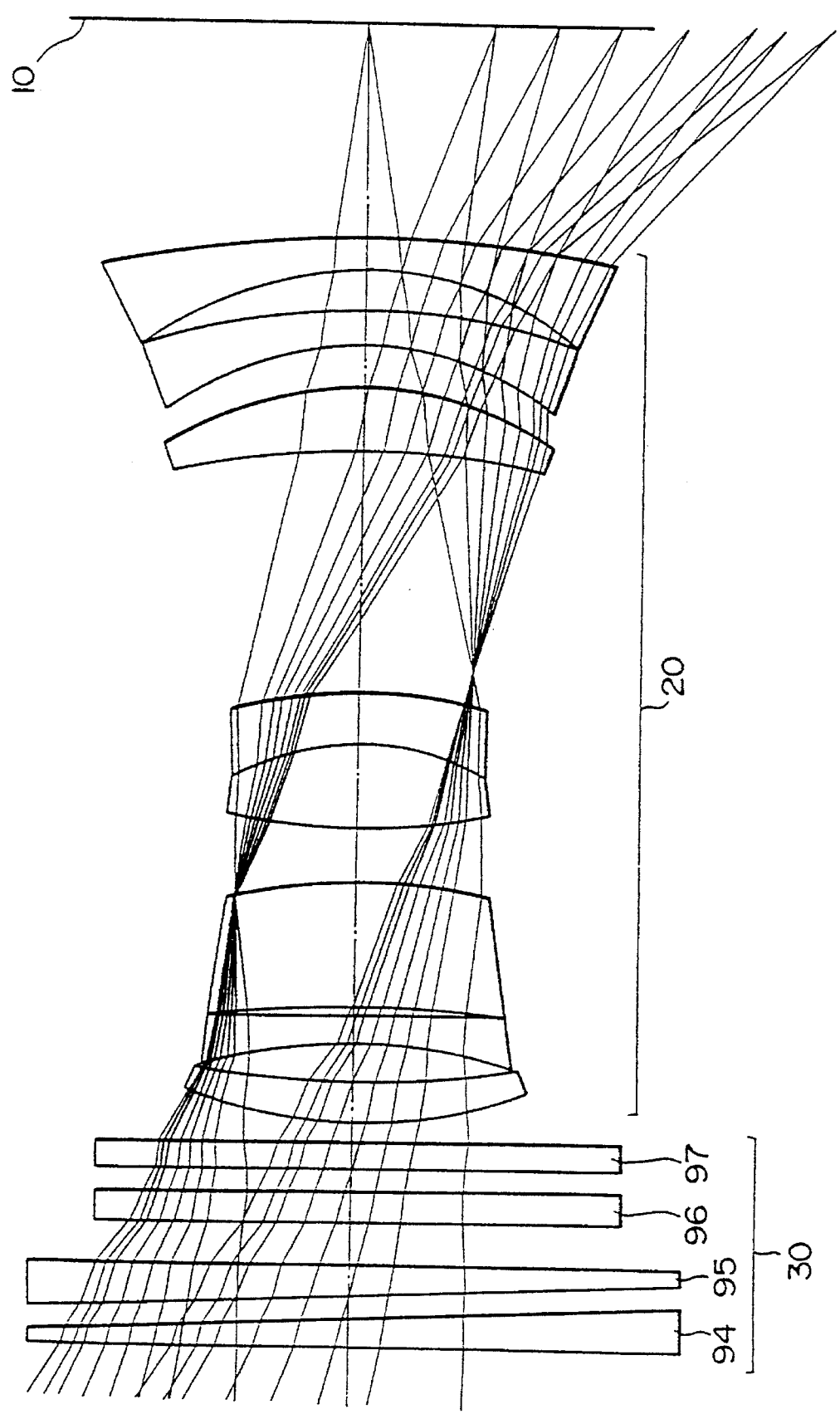
FIG. 23 is a sectional view of a lens showing a concrete example of a taking lens system which is provided with the image stabilizing apparatus of the fourth embodiment.
Figure 24:
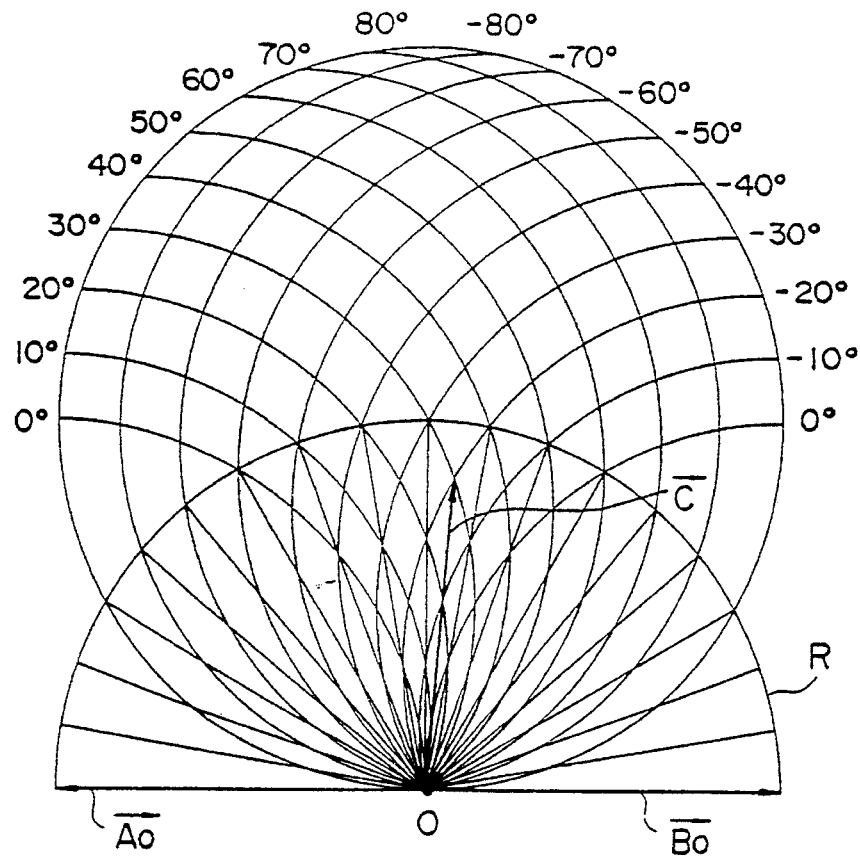
FIG. 24 is a schematic view showing the deflecting function caused by a prism of the conventional image stabilizing apparatus.
Figure 25:
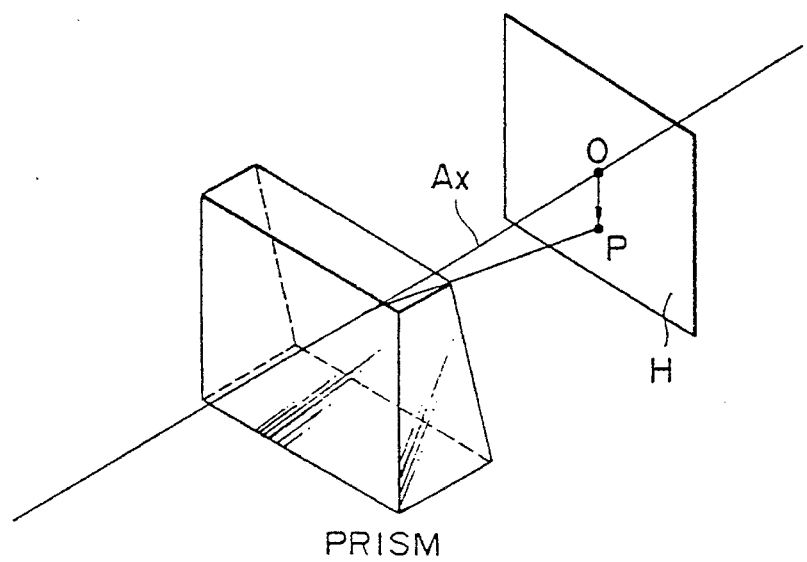
FIG. 25 is a schematic view for defining the deflecting function of the prism.

FIGS. 21 through 23 show a fourth embodiment.

An optical system shown in this embodiment includes, as shown in FIG. 21, an imaging lens 20, a image receiving surface 10 and an optical path deflecting portion 30.

The optical path deflecting portion 30 includes first, second, third and fourth movable prisms 94, 95, 96 and 97 pivotably supported on optical axis Ax of the imaging lens system 20. These movable prisms, as shown in FIG. 22, are arranged such that the angles formed by an axis indicating the deflecting function are 0°, 180°, 90° and 270° in their initial states.

The first and second movable prisms 94 and 95 are provided on opposite surfaces thereof with ring-shaped inner gears, 94a and 95a, with which a drive gear 80a mounted on a rotational shaft of the motor 80 is meshed. The motor 80 acts as a first drive mechanism for pivoting the first and second movable prisms 94 and 95 by a same angle in the opposite directions.

Likewise, the third and fourth movable prisms 96 and 97 are provided on opposite surfaces thereof with ring-shaped inner gears 96a and 97a, with which a drive gear 81a mounted on a rotational shaft of the motor 81 is meshed. The motor 81 acts as a second drive mechanism for pivoting the third and fourth movable prisms 96 and 97 by a same angle in opposite directions.

By virtue of the foregoing construction, the movable prisms 94, 95, 96 and 97, when pivoted by the motors 80 and 81, deflect the optical path to correct the displacement of the image caused by inclination of the whole optical system. At that time, the directions for correcting the image displacement caused by micro pivot of the first and second movable prisms 94 and 95 become 90° and 270°, and the direction for correcting the image displacement caused by micro pivot of the third and fourth movable prisms 96 and 97 become 0° and 180° as shown by a thick line in FIG. 22. The deflecting function of a set of the first and second movable prisms and that of the third and fourth movable prisms are perpendicular to each other.

As these movable prisms do not adversely affect the image efficiency in their initial states, it is preferable that at least prisms within the set have the same chromatic aberration and the same deflecting function.

Control means for controlling the motors 80 and 81 include a sensor 41 and a controller 42 similar to those of the above-mentioned embodiment.

According to this construction, when the lens system is inclined, the sensor 41 detects the inclination, and the controller 42 resolves such detected inclination into two perpendicular components in a plane perpendicular to the optical axis. The controller 42 calculates the pivoting amount of the first and second movable prisms 94 and 95 required for correcting the moving components in the 90° and 270° directions, actuates the motor 80, also calculates the pivoting amount of the third and fourth movable prisms 96 and 97 required for correcting the moving components in the 0° and 180° directions, and actuates the motor 81. In this way, by pivoting four prisms, displacement of an image on the image receiving surface 10 can be corrected.

FIG. 23 shows a concrete example of a taking lens provided with an optical path deflecting portion 30 formed of four movable prisms and disposed at the subject side of the imaging lens system 20.

In order to reduce the generation of ghosts, the respective movable prisms are arranged such that each surface of the prisms is not vertical to the optical axis.

Also, in case the chromatic aberration of the prisms greatly affects the image efficiency as when used in a telephoto lens, it is preferable that the chromatic aberration is corrected for respective prisms.

In the above-mentioned embodiment, the prisms of each set are driven by a single motor and gear so that the prisms are driven by a same amount and the driving mechanism is simple. However, it may be designed such that separate driving means are provided for each prism and the driving means are controlled by software in order to drive the prisms of each set by a same amount.

According to the fourth embodiment, by resolving the inclination of the optical system into two perpendicular components in a plane perpendicular to the optical axis and correcting the respective components using two prisms, the displacement of a image caused by inclination can be corrected rapidly and easily. Also, if it is constructed such that the prisms in each set are driven by the same driving mechanism, the driving mechanism does not become complicated.

What is claimed is:

1. An image stabilizing apparatus comprising:

an imaging optical system for forming an image of a subject onto an imaging surface;

two moveable prisms disposed in such a manner to be pivotal about an axis parallel with an optical axis of said imaging optical system passing through said prisms, in said imaging optical system, said two moveable prisms performing deflecting functions, an angle $\theta$ between deflection vectors of said prisms being $45°<\theta<135°$ in an initial state, said deflection vectors being defined by said deflecting functions projected on a plane perpendicular to the optical axis of said optical system; and control means for changing directions of said deflecting functions in order to correct for a displacement of the image on said imaging surface.

2. An image stabilizing apparatus according to claim 1, wherein said movable prisms are disposed in a generally afocal optical path of said optical system.

3. An image stabilizing apparatus according to claim 1, wherein said movable prisms are disposed at a side of said optical system which is nearest to a subject of said optical system.

4. An image stabilizing apparatus according to claim 1, wherein said angle $\theta$ formed between said deflection vectors is 90° in its initial state.

5. An image stabilizing apparatus according to claim 1, wherein each of said movable prisms is a chromatic aberration correction prism formed of a plurality of prism bodies cemented together.

6. An image stabilizing apparatus according to claim 1, further comprising:

a stationary prism for providing a deflecting function for offsetting the deflecting functions of said moveable prisms in their initial state.

7. An image stabilizing apparatus comprising:

an optical system for forming an image of a subject onto an imaging surface;

two moveable prisms disposed in such a manner to be pivotal about an axis parallel with an optical axis of said optical system, said movable prisms performing deflecting functions, an angle $\theta$ formed by deflection vectors of said prisms being $45°<\theta<135°$ in an initial state, said deflection vectors of said prisms being defined by said deflecting functions projected on a plane perpendicular to the optical axis of said optical system;

a stationary prism group for providing a deflecting function for offsetting the deflecting functions of said moveable prisms in said initial state; and control means for changing a direction of said deflecting function in order to correct for a displacement of the image on said imaging surface.

8. An image stabilizing apparatus according to claim 7, wherein said stationary prism group is disposed at a side of said optical system farthest from a subject of said optical system.

9. An image stabilizing apparatus according to claim 7, wherein said movable prisms and said stationary prism group are generally equal in dispersion.

10. An image stabilizing apparatus according to claim 7, wherein each of said two movable prisms is a chromatic aberration correction prism formed of a plurality of prism bodies cemented together.

11. An image stabilizing apparatus comprising:

an optical system for forming an image of a subject onto an imaging surface;

first, second, third and fourth movable prisms disposed to be pivotal about an axis parallel to an optical axis of said optical system, each movable prism performing a deflecting function, angles θ, formed between deflection vectors being 0°, 180°, 90°, and 270° in initial states, each said deflection vector being defined by a direction of a deflection function of each of said prisms projected on a plane perpendicular to the optical axis of said optical system; and control means for changing said directions of said deflecting functions in order to correct for a displacement of the image on said imaging surface.

12. An image stabilizing apparatus according to claim 11 wherein said control means pivots both said first and second movable prisms in a reverse direction by a same angle and pivots both said third and fourth movable prisms in a reverse direction by a same angle.

13. An image stabilizing apparatus according to claim 11, wherein said movable prisms are disposed in a general afocal optical path of said optical system.

14. An image stabilizing apparatus according to claim 11, wherein said movable prisms are disposed at a side of said optical system nearest to a subject of said optical system.

15. An image stabilizing apparatus according to claim 11, wherein said first movable prism and said second movable prism have the same deflecting function and chromatic aberration, and said third movable prism and said fourth movable prism have the same deflecting function and chromatic aberration.

16. An image stabilizing apparatus according to claim 11, wherein each of said movable prisms is a chromatic aberration correction prism formed of a plurality of prism bodies cemented together.

* * * * *